United States Patent
Kim et al.

(10) Patent No.: US 11,026,193 B2
(45) Date of Patent: Jun. 1, 2021

(54) METHOD FOR TRANSMITTING SYNCHRONIZATION SIGNAL AND BASE STATION, AND METHOD FOR RECEIVING SYNCHRONIZATION SIGNAL AND USER EQUIPMENT

(71) Applicant: LG ELECTRONICS INC., Seoul (KR)

(72) Inventors: Eunsun Kim, Seoul (KR); Kijun Kim, Seoul (KR); Suckchel Yang, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/088,049

(22) PCT Filed: Mar. 24, 2017

(86) PCT No.: PCT/KR2017/003215
§ 371 (c)(1),
(2) Date: Sep. 24, 2018

(87) PCT Pub. No.: WO2017/164700
PCT Pub. Date: Sep. 28, 2017

(65) Prior Publication Data
US 2020/0305098 A1    Sep. 24, 2020

Related U.S. Application Data

(60) Provisional application No. 62/313,095, filed on Mar. 24, 2016.

(51) Int. Cl.
*H04W 56/00* (2009.01)
*H04W 16/28* (2009.01)
*H04W 72/04* (2009.01)

(52) U.S. Cl.
CPC ......... *H04W 56/001* (2013.01); *H04W 16/28* (2013.01); *H04W 72/046* (2013.01); *H04W 72/0446* (2013.01)

(58) Field of Classification Search
CPC .......... H04W 72/0446; H04W 72/046; H04W 16/28; H04W 56/001; H04J 11/00
See application file for complete search history.

(56) References Cited

U.S. PATENT DOCUMENTS

2016/0066291 A1    3/2016  Awad et al.
2016/0277225 A1*   9/2016  Frenne .................. H04L 27/261
(Continued)

FOREIGN PATENT DOCUMENTS

KR    1020150087842    7/2015
WO       2013112032    8/2013
(Continued)

OTHER PUBLICATIONS

PCT International Application No. PCT/KR2017/003215, Written Opinion of the International Searching Authority dated Jun. 23, 2017, 15 pages.

*Primary Examiner* — Brian D Nguyen
(74) *Attorney, Agent, or Firm* — Lee Hong Degerman Kang Waimey

(57) ABSTRACT

N synchronization signals (where, N is an integer greater than 1) may be transmitted in a first subframe. M synchronization signals among the N synchronization signals (where, M is an integer satisfying M<N) may be turned off. The remaining N−M synchronization signals except the M synchronization signals may be transmitted in a second subframe. Each of the first subframe and the second subframe may comprise a plurality of time symbol sets, each including one or more time symbols in the time domain. The N synchronization signals may be transmitted in N time symbol sets among the plurality of time symbol sets of the
(Continued)

first subframe, respectively. The N−M synchronization signals may be transmitted in N−M time symbol sets among the plurality of time symbol sets of the second subframe, respectively.

16 Claims, 17 Drawing Sheets

(56) References Cited

U.S. PATENT DOCUMENTS

| | | | |
|---|---|---|---|
| 2016/0308637 A1* | 10/2016 | Frenne | H04J 11/0069 |
| 2018/0219659 A1* | 8/2018 | Wernersson | H04B 7/024 |
| 2018/0241458 A1* | 8/2018 | Jung | H04B 7/0697 |
| 2018/0309495 A1* | 10/2018 | Xiong | H04J 11/00 |
| 2018/0359044 A1* | 12/2018 | Pirskanen | H04B 7/0617 |

FOREIGN PATENT DOCUMENTS

| | | |
|---|---|---|
| WO | 2014098444 | 6/2014 |
| WO | 2015017999 | 2/2015 |

* cited by examiner (a) Number of BRS ports = 8 | P0 | P1 | P2 | P3 | P4 | P5 | P6 | P7 |

(b) Number of BRS ports = 4 | P0 | P1 | P2 | P3 | P0 | P1 | P2 | P3 |

(c) Number of BRS ports = 2 | P0 | P1 | P0 | P1 | P0 | P1 | P0 | P1 |

(a)　　(b)

METHOD FOR TRANSMITTING SYNCHRONIZATION SIGNAL AND BASE STATION, AND METHOD FOR RECEIVING SYNCHRONIZATION SIGNAL AND USER EQUIPMENT

CROSS-REFERENCE TO RELATED APPLICATIONS

This application is the National Stage filing under 35 U.S.C. 371 of International Application No. PCT/KR2017/003215, filed on Mar. 24, 2017, which claims the benefit of U.S. Provisional Application No. 62/313,095, filed on Mar. 24, 2016, the contents of which are all hereby incorporated by reference herein in their entireties.

TECHNICAL FIELD

The present invention relates to a wireless communication system, and more particularly to, methods and devices for transmitting/receiving synchronization signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for transmitting a synchronization signal by a base station (BS). The method may include: transmitting N synchronization signals (where N is an integer greater than 1) in a first subframe; and turning off M synchronization signals (where M is an integer smaller than N) among the N synchronization signals and transmitting the remaining N−M synchronization signals in a second subframe. Each of the first and second subframes may include a plurality of time symbol sets, each of which includes one or more time symbols in a time domain. The N synchronization signals may be respectively transmitted in N time symbol sets among the plurality of time symbol sets in the first subframe, and the N−M synchronization signals may be respectively transmitted in N−M time symbol sets among the plurality of time symbol sets in the second subframe.

In another aspect of the present invention, provided herein is a base station (BS) for transmitting a synchronization signal. The BS may include a radio frequency (RF) unit and a processor configured to control the RF unit. The processor may be configured to: control the RF unit to transmit N synchronization signals (where N is an integer greater than 1) in a first subframe; and control the RF unit to turn off M synchronization signals (where M is an integer smaller than N) among the N synchronization signals and transmit the remaining N−M synchronization signals in a second subframe. Each of the first and second subframes may include a plurality of time symbol sets, each of which includes one or more time symbols in a time domain. The N synchronization signals may be respectively transmitted in N time symbol sets among the plurality of time symbol sets in the first subframe, and the N−M synchronization signals may be respectively transmitted in N−M time symbol sets among the plurality of time symbol sets in the second subframe.

In a further aspect of the present invention, provided herein is a method for receiving a synchronization signal by a user equipment (UE). The method may include: receiving a first synchronization signal among N synchronization signals (where N is an integer greater than 1) in a time symbol set with a first index among a plurality of time symbol sets in a first subframe; receiving information indicating that the time symbol set of the first synchronization signal is changed; and receiving the first synchronization signal in a time symbol set with a second index, which is different from the first index, among a plurality of time symbol sets in a second subframe.

In still another aspect of the present invention, provided herein is a User Equipment (UE) for receiving a synchronization signal. The UE may include a radio frequency (RF) unit and a processor configured to control the RF unit. The processor may be configured to: control the RF unit to receive a first synchronization signal among N synchronization signals (where N is an integer greater than 1) in a time symbol set with a first index among a plurality of time symbol sets in a first subframe; and if the RF unit receives information indicating that the time symbol set of the first synchronization signal is changed, control the RF unit to receive the first synchronization signal in a time symbol set with a second index, which is different from the first index, among a plurality of time symbol sets in a second subframe.

In each aspect of the present invention, the N time symbol sets may be consecutive, and the N−M time symbol sets may be consecutive.

In each aspect of the present invention, the N−M time symbol sets may be composed of symbols at the start of the second subframe or symbols at the end of the second subframe.

In each aspect of the present invention, either the N synchronization signals or the N−M synchronization signals may be transmitted in each of a plurality of subframes for synchronization signal transmission. The plurality of subframes for the synchronization signal transmission occur on a first periodicity. The first and second subframes may be included in the subframes for the synchronization signal transmission.

In each aspect of the present invention, the BS may transmit information indicating the second subframe where the M synchronization signals are off.

In each aspect of the present invention, the BS may transmit information indicating that some of the N synchronization signals are off.

In each aspect of the present invention, the M synchronization signals may be transmitted with a second periodicity longer than the first periodicity after the first subframe. When receiving a random access preamble on a random access channel resource associated with a first synchronization signal among the M synchronization signals, the BS may turn on one synchronization signal and transmit the N−M synchronization signals and the first synchronization signal in N−M+1 time symbol sets with the first periodicity. In this case, the N−M+1 time symbol sets may be consecutive.

In each aspect of the present invention, the N synchronization signals may be transmitted in different directions within a cell.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR THE INVENTION

Figure 1:
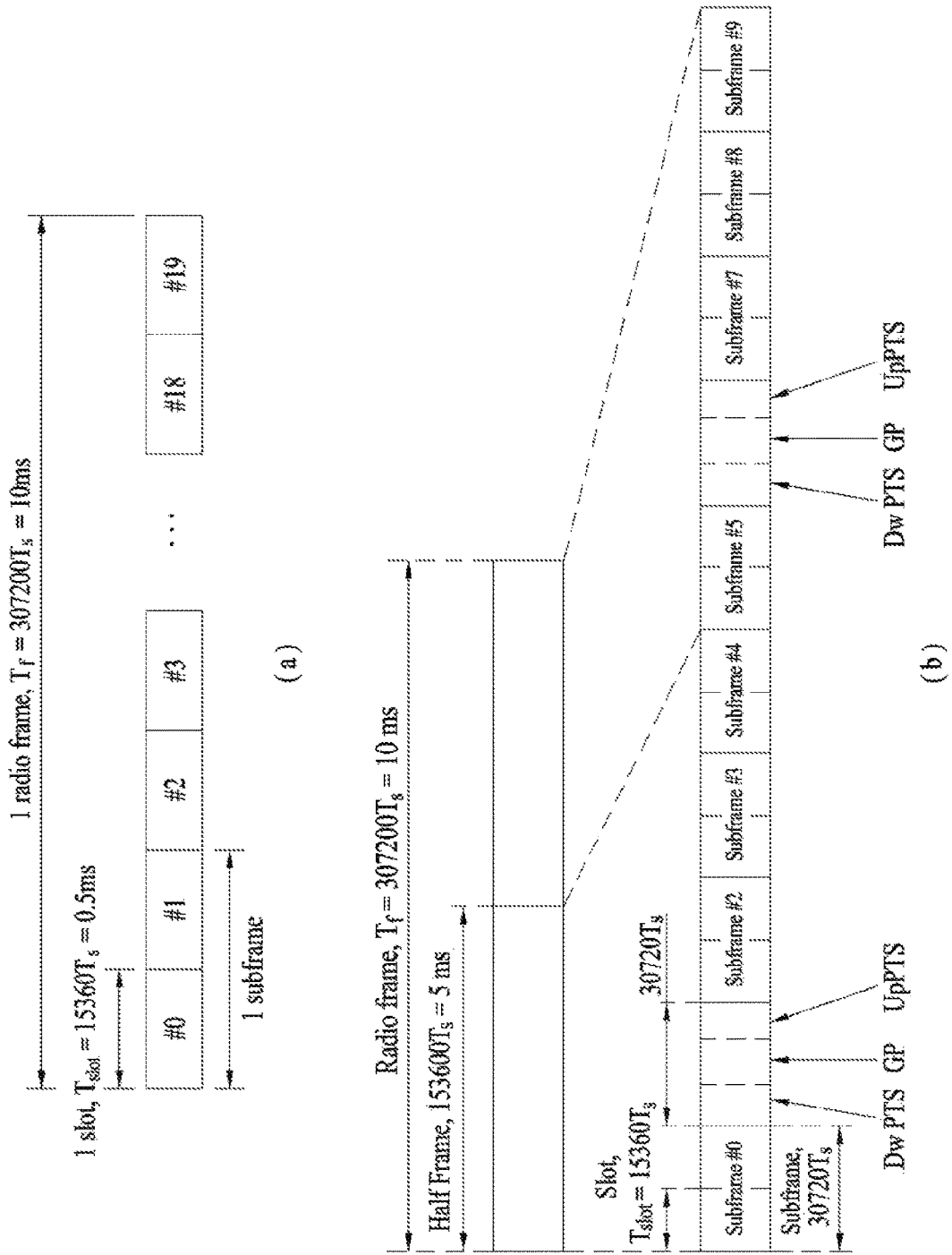
FIG. 1 illustrates the structure of a radio frame used in the LTE/LTE-A based wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
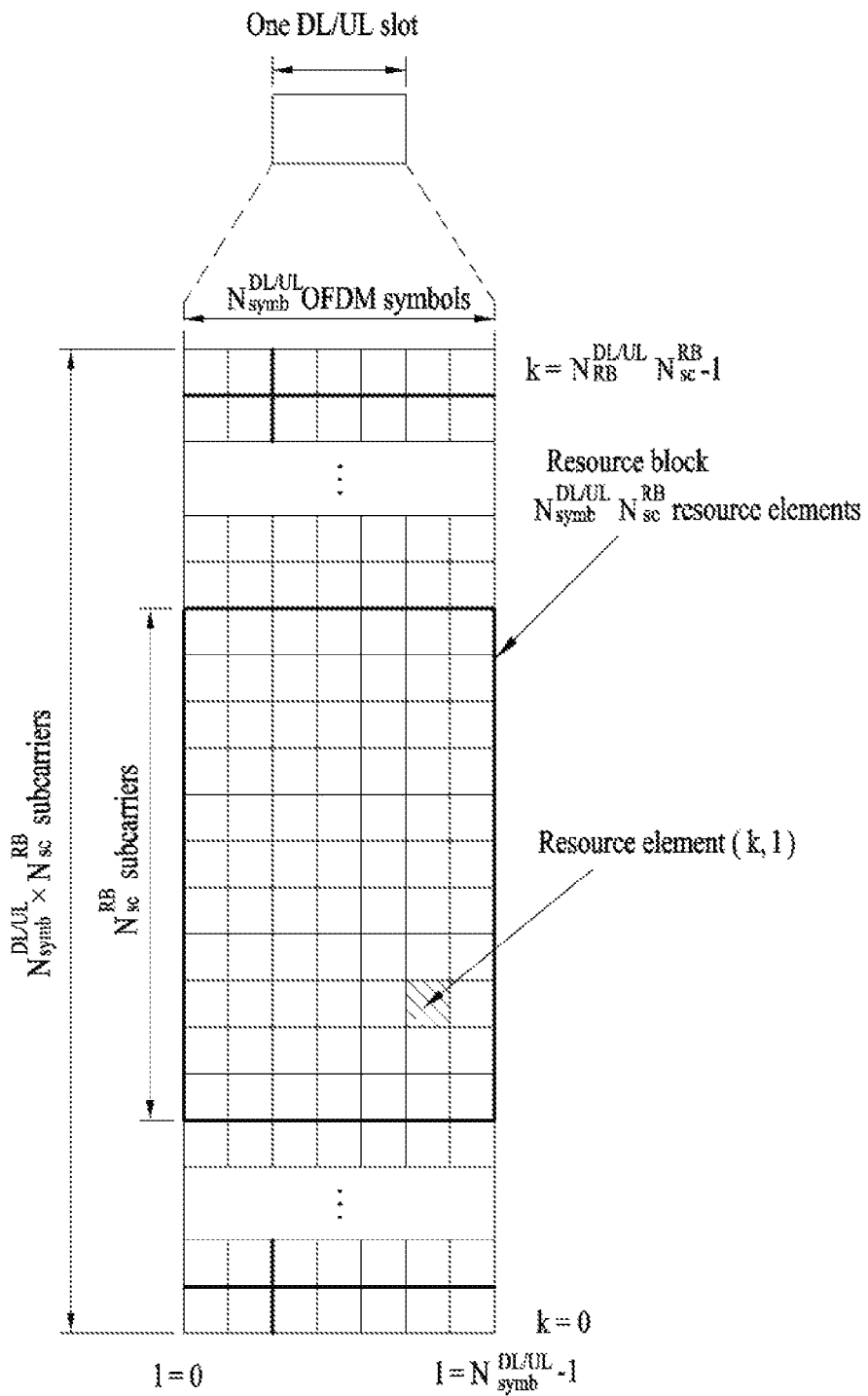
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. In the present invention, an OFDM symbol or SC-1-DM symbol may be referred to as a symbol or a time symbol. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
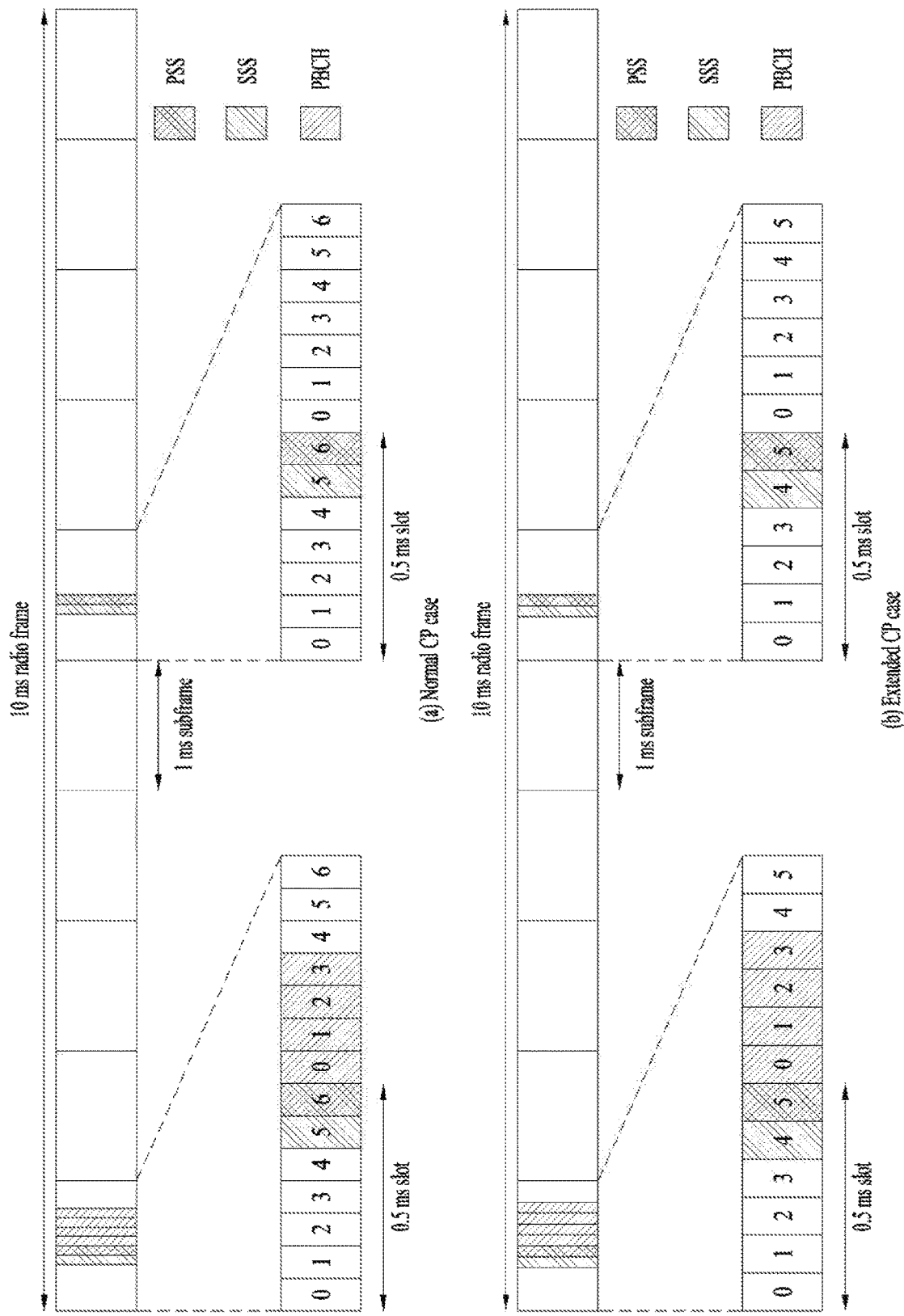
FIG. 3 illustrates a radio frame structure for transmission of a synchronization signal (SS) slot in the LTE/LTE-A based wireless communication system.

FIG. 3 illustrates a radio frame structure for transmission of a synchronization signal (SS) in the LTE/LTE-A based wireless communication system. Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and may be categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

The random access procedure is also referred to as a random access channel (RACH) procedure. The random access procedure is used for various purposes including initial access, adjustment of UL synchronization, resource assignment, and handover. Random access procedures are categorized into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible for multiple UEs to transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without collision with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive an RAR within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

A random access preamble, i.e., a RACH preamble consists of a cyclic prefix (CP) having a length of $T_{CP}$ and a sequence part having a length of $T_{SEQ}$. $T_{CP}$ and $T_{SEQ}$ depend on a frame structure and a random access configuration, and preamble formats are controlled by higher layers. The RACH preamble is transmitted in a UL subframe. Transmission of random access preambles is restricted to be performed on certain time and frequency resources. Such a resource is referred to as a PRACH resource. PRACH resources are numbered as the subframe number increases in a radio frame and the RPB number increases in the frequency domain so that index 0 may correspond to the lowest PRB and subframe in the radio frame. In addition, random access resources are defined according to a PRACH configuration index (cf. 3GPP TS 36.211). The PRACH configuration index is provided through a higher layer signal (transmitted from an eNB).

Figure 4:
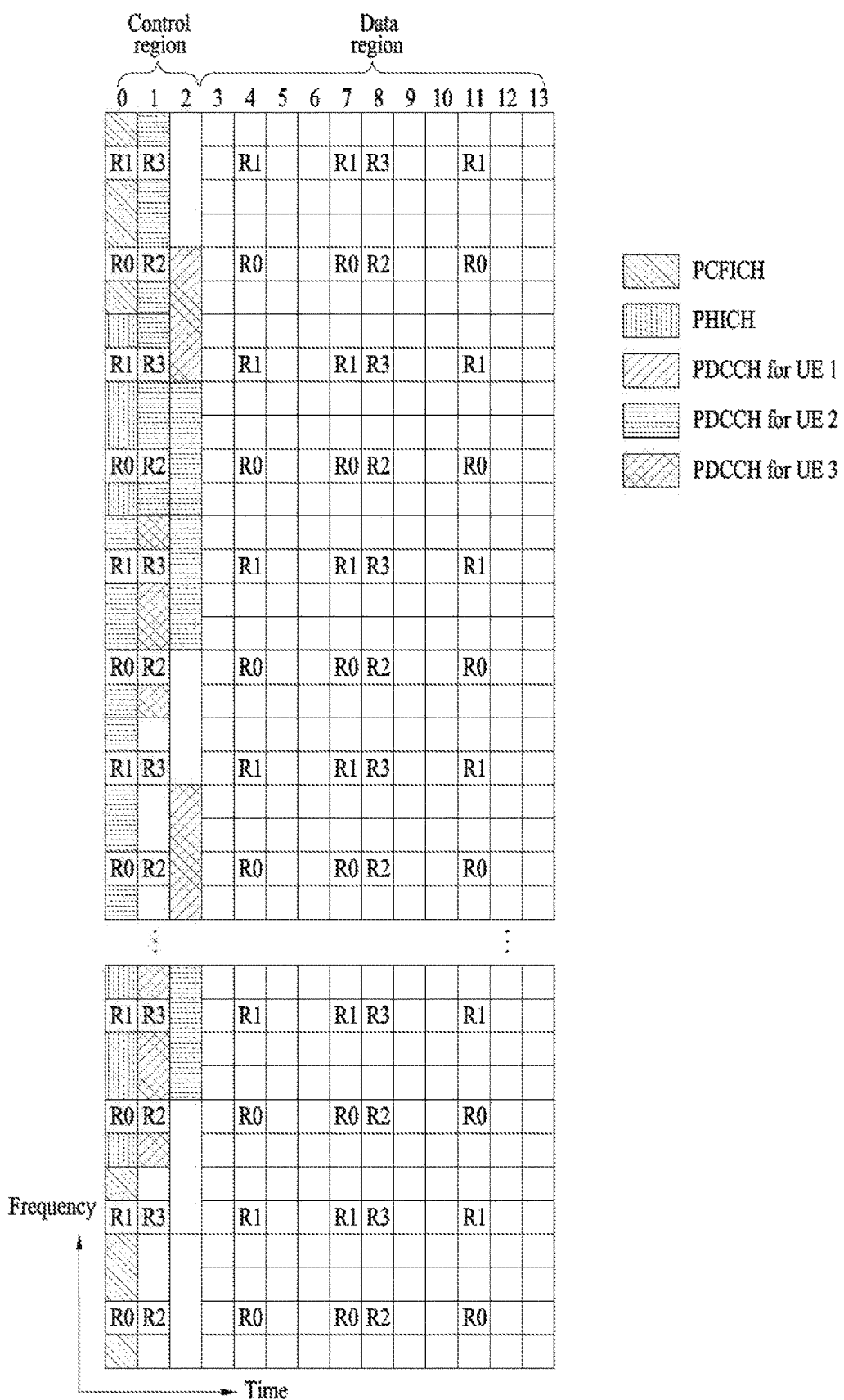
FIG. 4 illustrates the structure of a DL subframe used in the LTE/LTE-A based wireless communication system.

FIG. 4 illustrates the structure of a DL subframe used in the LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PC- FICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Figure 5:
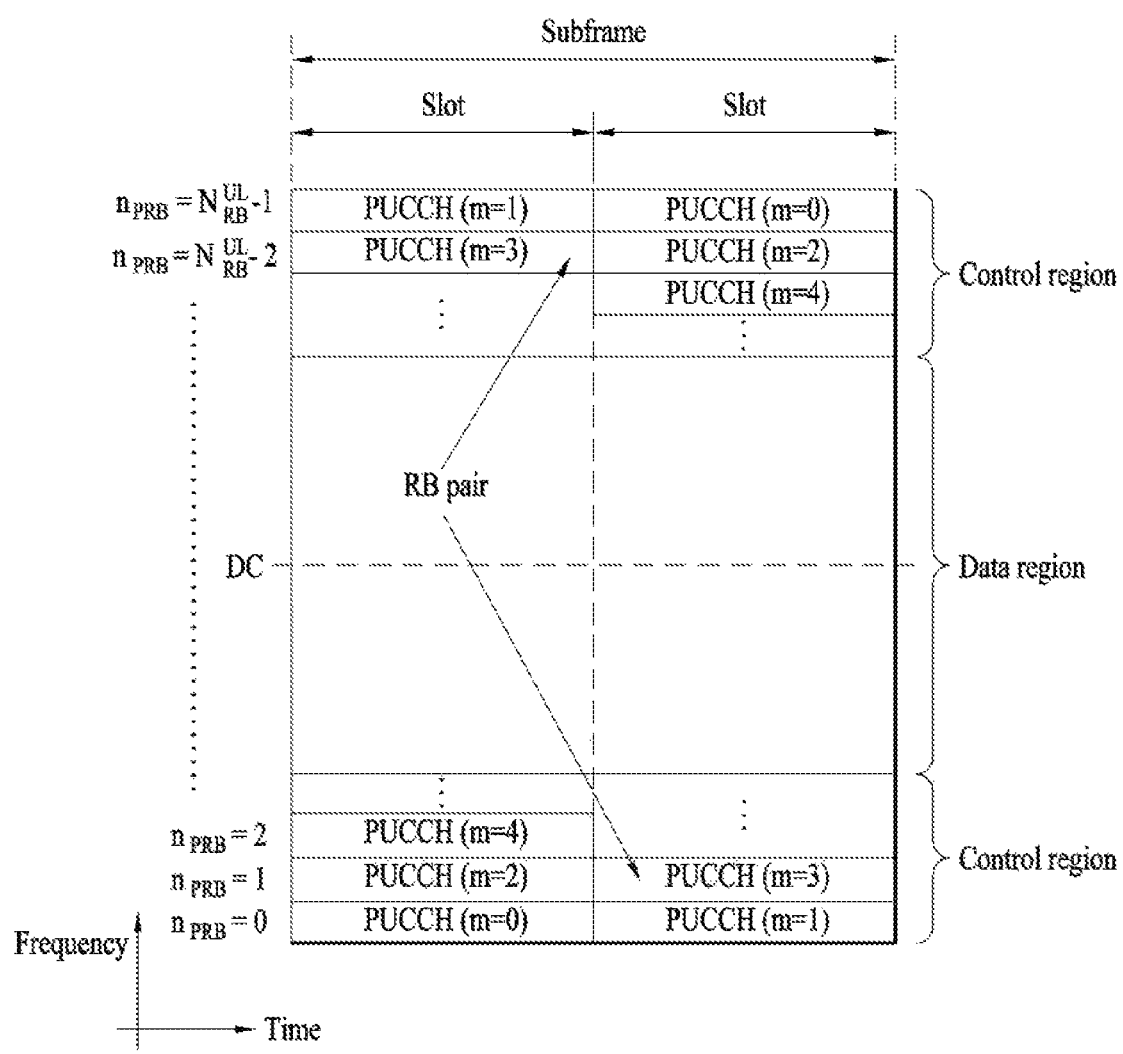
FIG. 5 illustrates the structure of a UL subframe used in the LTE/LTE-A based wireless communication system.

FIG. 5 illustrates the structure of a UL subframe used in the LTE/LTE-A based wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Figure 6:
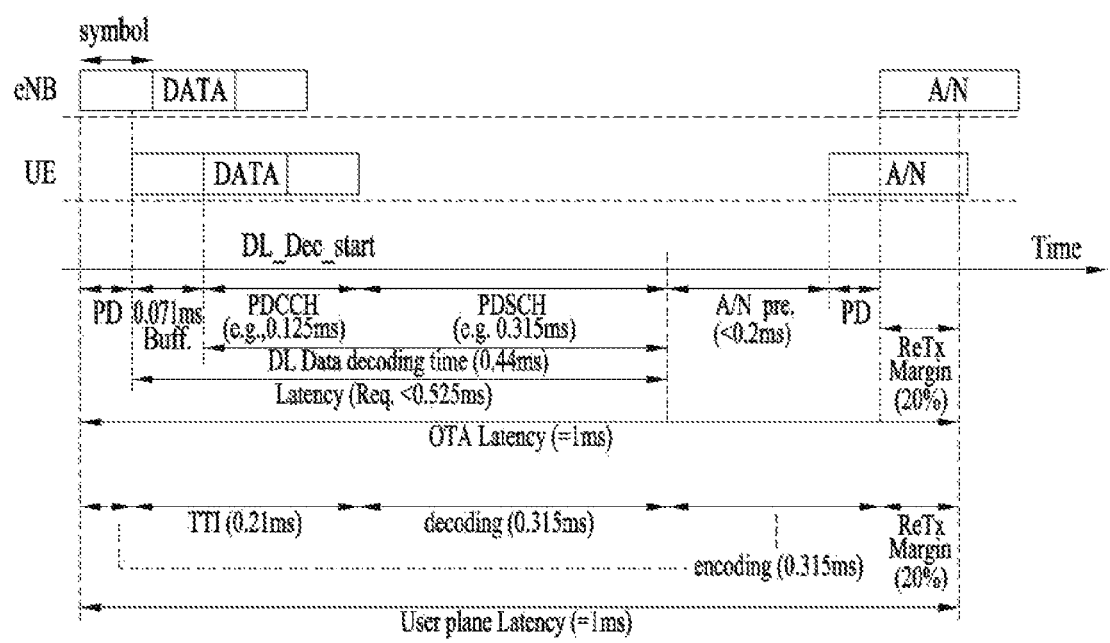
FIG. 6 illustrates the length of a transmission time interval (TTI) which is needed to implement low latency.

FIG. 6 illustrates the length of a transmission time interval (TTI) which is needed to implement low latency.

Referring to FIG. 6, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 6 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In addition, in the following description, a physical downlink control channel/physical downlink data channel/physical uplink control channel/physical uplink data channel transmitted in units of the default/main TTI are referred to as a PDCCH/PDSCH/PUCCH/PUSCH, and a PDCCH/PDSCH/PUCCH/PUSCH transmitted within an sTTI or in units of sTTI are referred to as sPDCCH/sPDSCH/sPUCCH/sPUSCH. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

The embodiments of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/ OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

<OFDM Numerology>

The new RAT system uses an OFDM transmission scheme or a similar transmission scheme. For example, the new RAT system may follow the OFDM parameters defined in the following table.

TABLE 1

| Parameter | Value |
|---|---|
| Subcarrier-spacing (Δf) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Self-Contained Subframe Structure>

Figure 7:
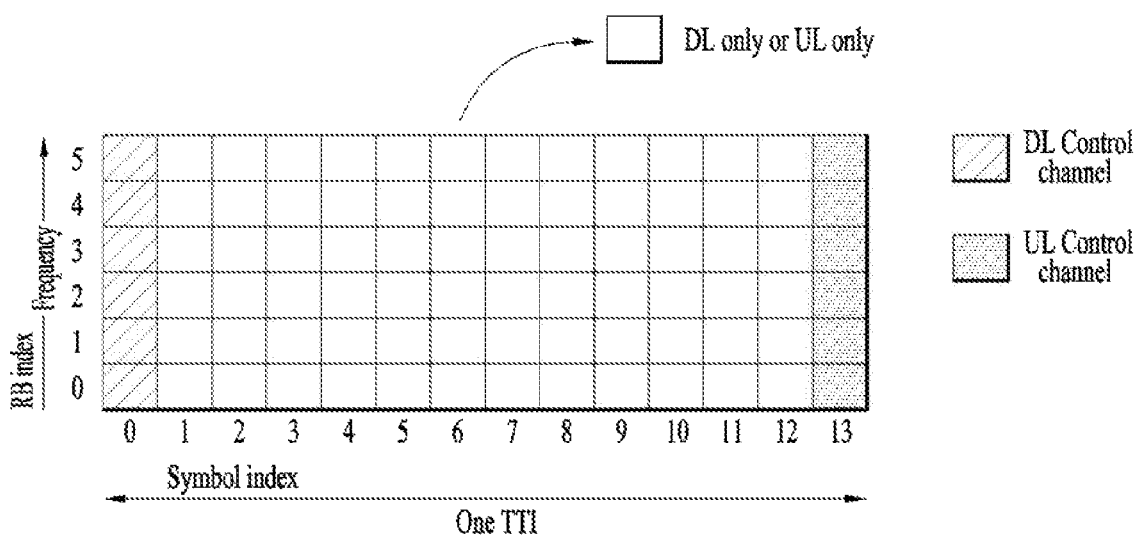
FIG. 7 illustrates a self-contained subframe structure.

FIG. 7 illustrates a self-contained subframe structure.

In order to minimize the latency of data transmission in the TDD system, a self-contained subframe structure is considered in the new fifth-generation RAT.

In FIG. 7, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 7, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In the legacy LTE/LTE-A system, a DL control channel is Time Division Multiplexed (TDMed) with a data channel (cf. FIG. 4), and a PDCCH which is a control channel is transmitted over the entire system band. However, in the new RAT system, it is expected that the minimum system bandwidth is 100 MHz or wider, and thus it is difficult to transmit a control channel over the entire band. If a UE monitors the entire band to transmit/receive data or receive a DL control channel, it may increase the battery consumption of the UE and degrade the efficiency of the UE. Hence, the present invention proposes a method for transmitting a DL control channel by localizing or distributing the DL control channel to or over partial frequency bands of the system band, i.e., channel band.

Figure 8:
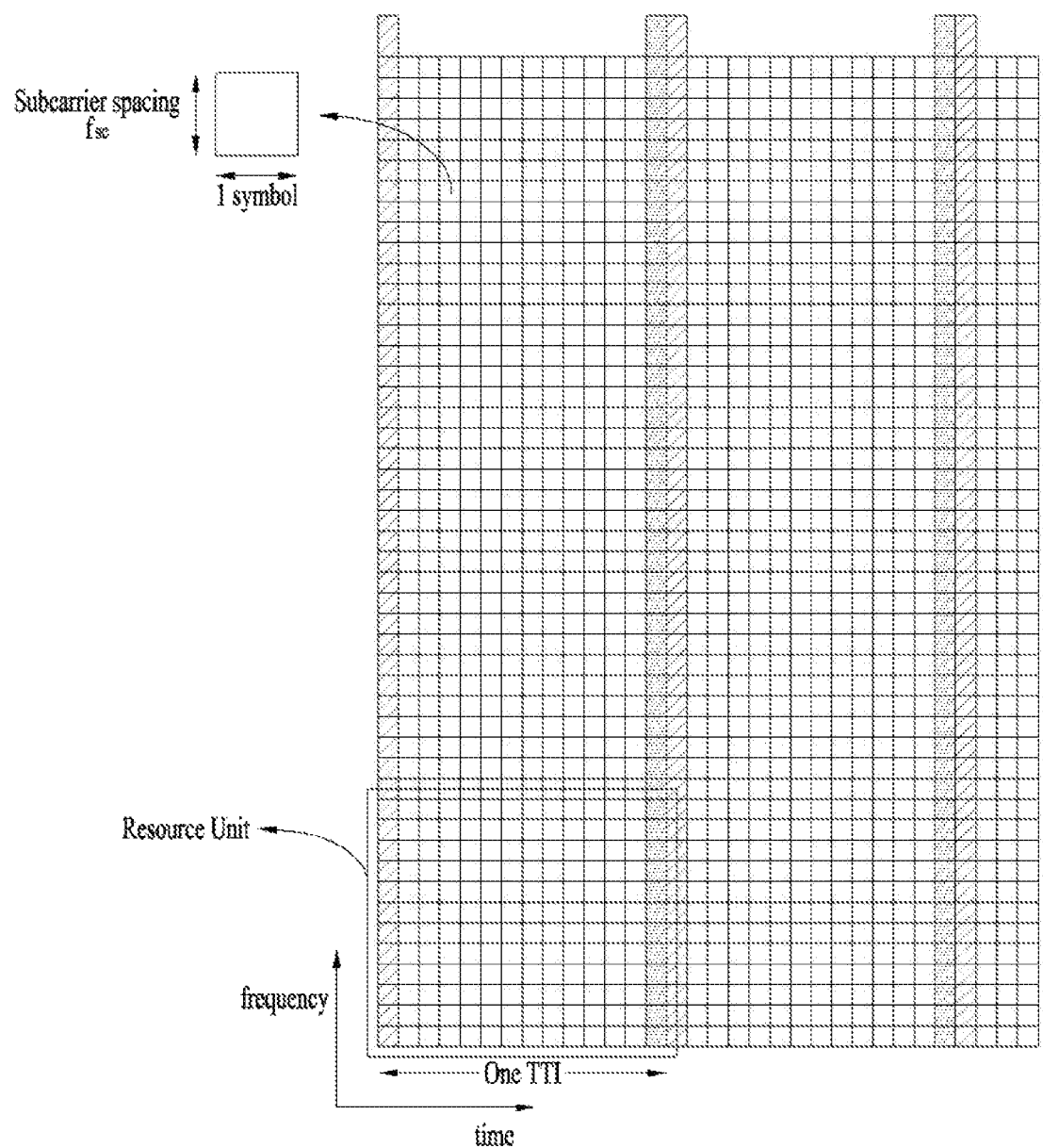
FIG. 8 illustrates a portion of the radio frame with the subframe structure where data and control channels are time division multiplexed.

FIG. 8 illustrates a portion of the radio frame with the subframe structure where data and control channels are TDMed.

Referring to FIG. 8, in a wideband system, a DL control channel can be Time Division Multiplexed (TDMed) with DL data or UL data and then transmitted. In this case, although an eNB may transmit a DL control channel(s) over the entire band, but one UE may receive its DL control channel in specific partial band rather than the entire band. In this case, the DL control channel corresponding to information transmitted from the eNB to the UE may contain not only DL specific information such as DL scheduling but also information on a cell configuration and UL specific information such as UL grant.

As shown in FIG. 8, in the new RAT system, a basic Resource Unit (RU) can be defined for DL/UL scheduling as in the legacy LTE system. The basic RU may include a plurality of OFDM symbols in the time domain and a plurality of subcarriers in the frequency domain. The basic RU may be defined such that it has different size in UL and DL. An eNB may perform DL/UL data scheduling for a UE on a RU basis, i.e., using an integer number of RUs. In FIG. 8, one block in the time-frequency resource grid, that is, a subcarrier with one OFDM symbol length can be defined as a Resource Element (RE).

For example, it is expected that the new RAT system, which is called the mmWave system or 5G system, will use wide system bandwidth. Specifically, depending on the frequency band, the minimum system bandwidth of 5 MHz, 10 MHz, 40 MHz, 80 MHz, etc. should be able to be supported. The minimum system band may vary according to the basic subcarrier spacing. For example, when the basic subcarrier spacing is respectively set to 15 kHz, 30 kHz, 120 kHz, and 240 kHz, the minimum system band may be 5 MHz, 10 MHz, 40 MHz, and 80 MHz, respectively. For example, the new RAT system is designed such that it operates on not only 6 GHz or less but 6 GHz or more and a plurality of subcarriers are used in one system to support various scenarios and use cases. When the length of a subcarrier is changed, the length of a subframe can increase/decrease according to the change in the subcarrier length. For example, one subframe may be defined to have a short time period, for example, 0.5 ms, 0.25 ms, 0.125 ms, etc. It is expected that the new RAT system will use high frequency band (e.g., 6 GHz or higher) and support a subcarrier spacing greater than 15 kHz, i.e., the subcarrier spacing of the conventional LTE system. For example, assuming that the subcarrier spacing is 60 kHz, one resource unit (RU) can be defined as twelve subcarriers in the frequency domain and one subframe in the time domain.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.52, (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Figure 9:
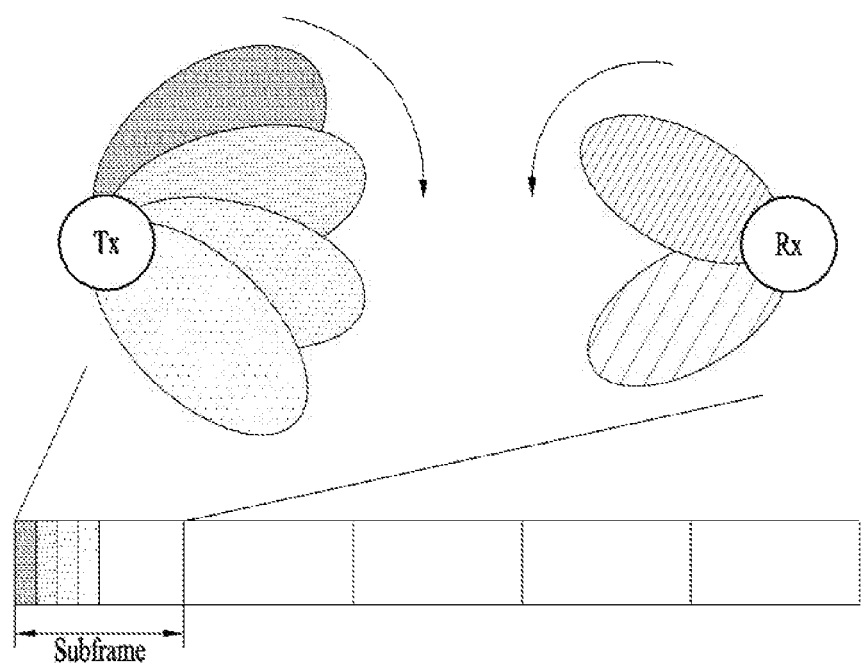
FIG. 9 illustrates an example of applying analog beamforming.

FIG. 9 shows an example where analog beamforming is applied.

Referring to FIG. 9, it is possible to transmit/receive signals by changing beam directions over time.

In the LTE/LTE-A system, non-UE-specific signals (e.g., PSS/SSS/PBCH/SI) have been transmitted omni-directionally, whereas, in the mmWave system, a method by which an eNB applies beamforming to cell-common signals by rotating beam directions omni-directionally and then transmit the cell-common signals has been considered. That is, beam sweeping or beam scanning means transmitting and receiving signals by rotating beam directions as described above.

To be associated with and served by a specific system, a UE should first perform the following operations. The UE should obtain the time and frequency synchronization of the corresponding system, receive basic System Information (SI), and adjust its uplink timing. In general, such a procedure is referred to as an initial access procedure, and the initial access procedure includes a synchronization procedure and an RACH procedure (i.e., random access procedure). Hereinafter, the above-mentioned synchronization procedure of the LTE system is briefly summarized for convenience of description.

PSS: Symbol timing acquisition, frequency synchronization, and cell ID detection within cell ID group (3 hypotheses).

SSS: cell ID group detection (168 hypotheses), 10-ms frame boundary detection, and cyclic prefix (CP) detection (2 hypotheses).

PBCH decoding: antenna configuration, 40-ms timing detection, system information, system bandwidth, etc.

That is, a UE obtains OFDM symbol timing and subframe timing as well as a cell ID based on a PSS and an SSS, performs descrambling and decoding of a PBCH using the cell ID, and then obtains important information of the corresponding system. The basic synchronization procedure of the mmWave or new RAT system (hereinafter referred to as the mmWave/new RAT system) is similar to the above-described procedure, but the PSS/SSS transmission/reception method of the mmWave/new RAT system is significantly different from the conventional one.

Figure 10:
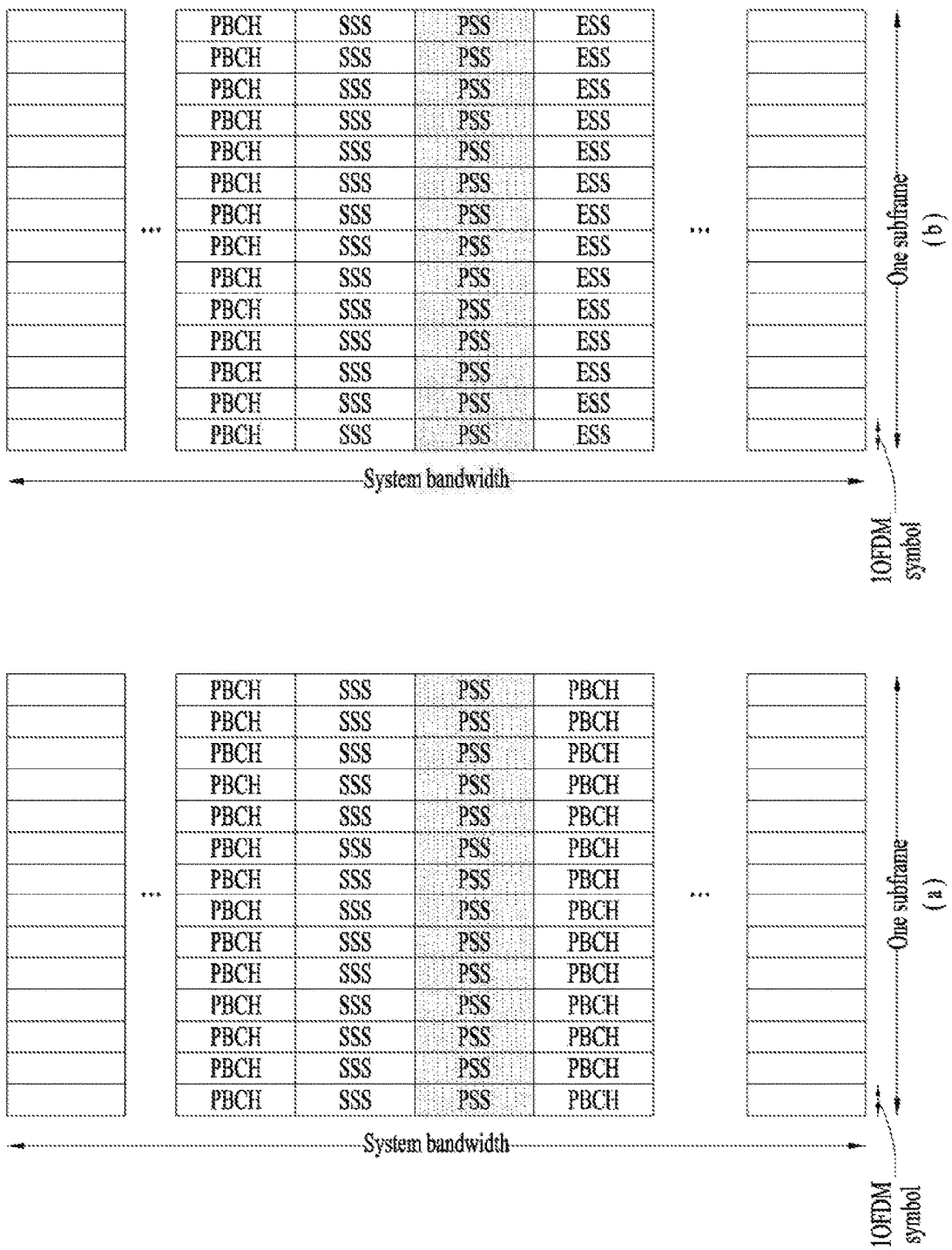
FIG. 10 illustrates examples of the time periods and resource regions of the new system where PSS/SSS/PBCH are transmitted.

FIG. 10 illustrates examples of the time periods and resource regions of the new system where PSS/SSS/PBCH are transmitted. Specifically, FIG. 10(a) shows an example of the PSS/SSS/PBCH transmission period, and FIG. 10(b) shows an example of the PSS/SSS/ESS/PBCH transmission period.

Referring to FIG. 10, when one subframe consists of 14 OFDM symbols, PSS/SSS/PBCH can be transmitted in different directions per OFDM symbol. The number of beam directions can be selected within the range of 1 to N. In addition, the number of beams (or beam directions) can be dynamically determined according to frequency or by considering cell interference. When detecting a PSS, a UE can obtain symbol synchronization and a physical cell ID. Alternatively, the UE can obtain a cell ID by detecting a PSS and an SSS.

In the LTE/LTE-A system, PSS/SSS have been transmitted omni-directionally, whereas, in the mmWave system, a method by which an eNB performs beamforming by rotating beam directions omni-directionally to transmit signals such as PSS/SSS/PBCH has been considered. That is, beam sweeping or beam scanning means transmitting and receiving signals by rotating beam directions as described above. For example, assuming that an eNB can support or have a maximum of N beam directions, the eNB can transmit signals such as PSS/SSS/PBCH in each of the N beam directions. In other words, the eNB transmits synchronization signals such as PSS/SSS/PBCH in each direction by sweeping the directions that the eNB can have or support. Alternatively, if the eNB can form N beams, one beam group may be composed of several beams. PSS/SSS/PBCH can be transmitted in each beam group. In this case, one beam group includes one or more beams.

When PSS/SSS/PBCH are transmitted based on beam scanning, a UE can acquire system timing as follows.

Symbol/Subframe Timing and Cell ID Acquisition

To obtain information on symbol timing, a UE detects a PSS transmitted at a fixed location (for example, in 6 or x PRBs with respect to the center frequency) or a variable location. Similarly, the UE can obtain subframe timing and/or frame timing by detecting an SSS transmitted at a known location, that is, at a location relative to that of the PSS transmission resource. Then, by combining the PSS and the SSS, the UE can obtain a cell ID. To prevent signals transmitted through the SSS and relevant hypotheses from significantly increasing, the UE may obtain the subframe timing by detecting an additional synchronization signal (e.g., Extended Synchronization Signal (ESS)) transmitted from the eNB.

The Number of Beam RS Ports

When PSS/SSS/PBCH and ESS are transmitted per beam direction, a Beam Reference Signal (BRS) can be transmitted for link quality measurement per beam direction. In other words, the BRS can be transmitted for the purpose of RSRP/RRM/RLM measurement, and it can be used for neighbor cell measurement. In addition, the BRS can be transmitted over the entire band to allow a UE to perform measurement over the entire band. For example, the BRS may be an RS transmitted over the entire band per antenna port for an analog beam direction in which the PSS/SSS are transmitted. In this case, the UE should know information on the number of ports used for BRS transmission and the location of resources per port on which the BRS is transmitted in advance. The number of ports used for the BRS transmission, that is, the number of BRS ports that the UE should measure at the corresponding time can be provided through the ESS. For example, assuming that the number of maximum BRS ports is 8, the eNB can inform the UE of {1, 2, 4, 8}, {2, 4, 6, 8}, or other combinations having different values through the ESS. Here, informing the number of antenna ports through the ESS may mean that the UE should attempt to detect the number of antenna ports from the ESS based on multiple hypotheses for the number of antenna ports. As another method for informing the number of BRS ports, the number of ports for a BRS that is transmitted in the same beam direction as a PBCH can be signaled on the PBCH. When the information on the BRS ports is transmitted on the PBCH, the UE should decode a PBCH of a neighbor cell and measure a BRS of the corresponding neighbor cell for neighbor cell measurement.

Extended Synchronization Signal/Sequence (ESS)

As described above, an ESS can be transmitted on frequency resources different from those used for transmitting PSS/SSS within the same symbol. When obtaining a cell ID and symbol timing, a UE may obtain subframe timing and frame timing from an ESS. Here, the acquisition of subframe timing may mean obtaining the start location of a subframe, that is, information indicating how many symbols exist prior to the symbol detected by the UE in the corresponding subframe. In addition, frame timing may be related to the transmission periodicity of a synchronization signal. After detecting a synchronization signal, the UE may estimate the time required until the same synchronization signal arrives and be able to know how many subframes exist prior to a specific subframe in the corresponding time interval. In addition, the number of BRS ports can be indicated through the ESS. Moreover, information on the number of DM-RS ports in a PBCH can be also indicated by the ESS. Simply, assuming that the PBCH is transmitted in the same transmit diversity scheme as that for SFBC, the number of PBCH DM-RS ports may be limited to 2. Alternatively, the number of PBCH DM-RS ports (for example, 1, 2, 4, or 8) may be indicated by the ESS. Further, the ESS may carry information on the system bandwidth or BRS transmission bandwidth. In this case, for RSRP measurement, the UE may check resources used for BRS transmission without decoding the PBCH.

PBCH Information Contents

A PBCH may contain information such as basic system information, system frame number, the number of antenna ports, system bandwidth, etc. Additionally, the PBCH may contain information on PRACH configuration, time-frequency resources used for System Information Block (SIB) (i.e., SI) transmission (or the periodicity of SIB transmission), time-frequency resources used for paging transmission, etc. The PRACH configuration information may be included in the SIB (i.e., SI). The information on the time-frequency resources that can be used for the SIB and paging transmission may be independently signaled per beam direction (for example, per beam index). Upon obtaining information on time-frequency resources that can be used for SIB and paging reception, a UE performs blind decoding for PDCCH detection in order to receive the corresponding information in the subframes designated for the SIB and paging reception. When a UE-specific Search Space (USS) and a Common Search Space (CSS) are configured for a UE, the UE expects that a common channel is transmitted in subframes for the SIB/paging and then performs blind decoding of both the USS and CSS because the information on the SIB/paging transmission corresponds to system information. The UE does not perform blind decoding (BD) of the CSS on other subframes except the subframes for the SIB/paging.

<Mapping of Synchronization Signals (PSS, SSS, ESS, PBCH and/or BRS)>

As described above, a UE can obtain frequency synchronization, symbol timing, a cell ID, subframe timing, and the like from PSS/SSS/ESS or a PBCH. In addition, the UE may perform PSS/SSS/ESS detection in each symbol of a subframe in which an SS is transmitted. When the UE obtains BRS port information and important system information as well as the symbol timing, subframe timing, and cell ID through PSS/SSS/ESS detection and PBCH decoding, if the cell ID obtained by the UE through the PSS/SSS detection in the corresponding subframe is identical to the cell ID that is previously obtained from another symbol, the UE may reuse the previously obtained basic information. In other words, when the UE detects PSS/SSS/ESS in a specific symbol of a subframe, performs PBCH decoding, and obtains system information, if the acquired cell ID is identical to the cell ID obtained from PSS/SSS received in another SS symbol of the corresponding subframe, the UE may skip the ESS detection or PBCH decoding. For example, if it can be assumed that the subframe/frame timing, BRS port information (e.g., the number of BRS ports, transmission bandwidth, etc.) and main system information is equal to the previously obtained system information, an eNB may skip the ESS detection or PBCH decoding. In addition, BRS measurement can be performed by reusing the previously received information. In particular, this operation may be applied when the UE performs initial access to a specific cell. However, it is preferred to perform the PSS/SSS/ESS PBCH detection and demodulation in each symbol during the initial access procedure to improve the accuracy thereof. Meanwhile, the UE may be configured to perform the above operation while performing neighbor cell measurement. In this case, regarding BRSs transmitted from a specific cell, the UE can assume that every symbol where a BRS is present contains the same BRS transmission information such as the number of BRS ports, BRS transmission bandwidth, etc. If the UE is unable to assume that each symbol where a BSR is present contains the same BSR transmission information regarding BSRs from a specific cell, the UE should perform the ESS detection and PBCH decoding in different symbols even for the same cell.

Based on the above discussion, the present invention proposes a method for mapping synchronization signals such as a PSS, an SSS, an ESS, a PBCH and/or a BRS (hereinafter PSS/SSS/ESS/PBCH/BRS) to an actual time-frequency region.

Figure 11:
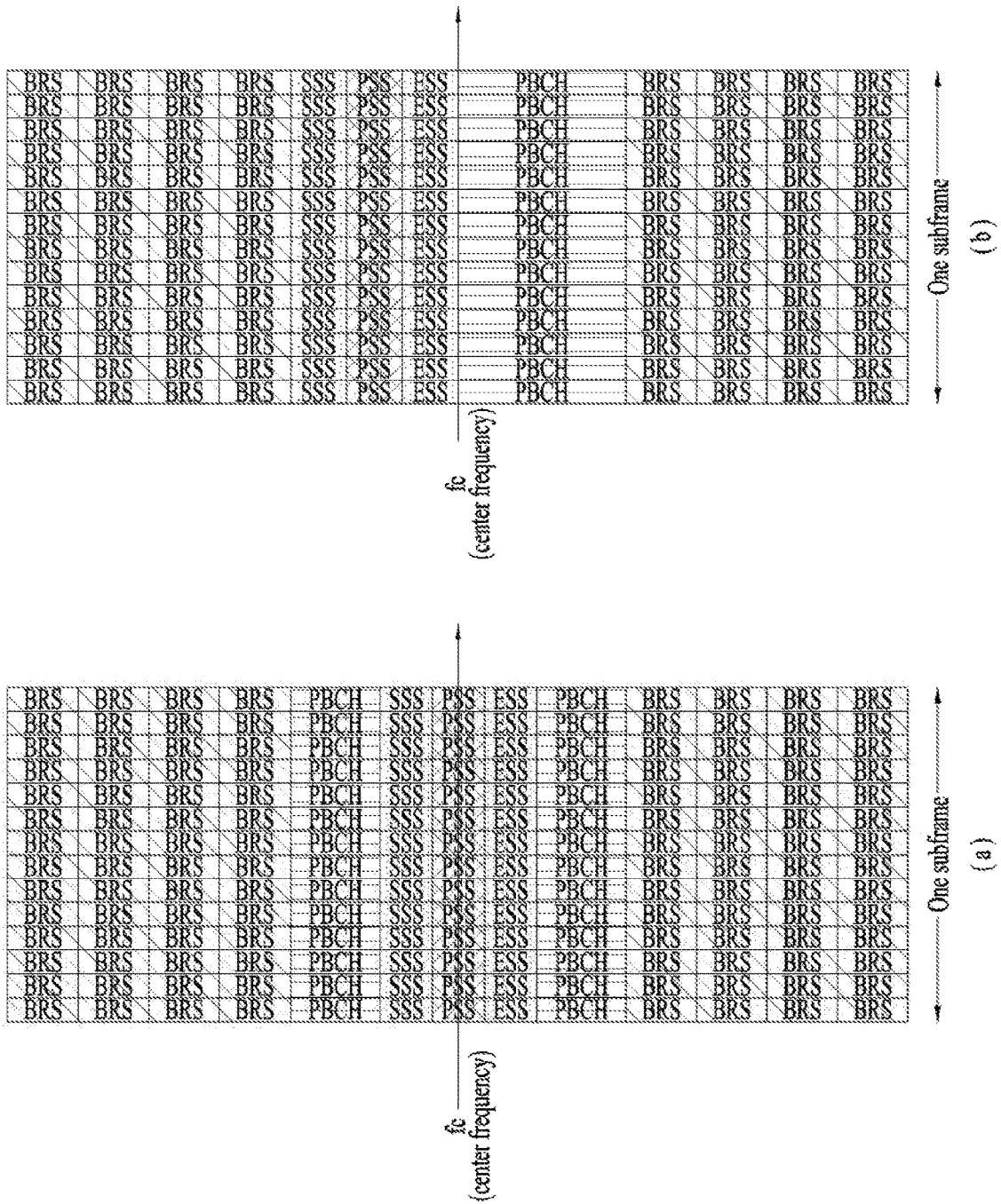
FIGS. 11 and 12 illustrate methods for mapping reference signals such as PSS/SSS/ESS/PBCH/BRS according to the present invention.
Figure 12:
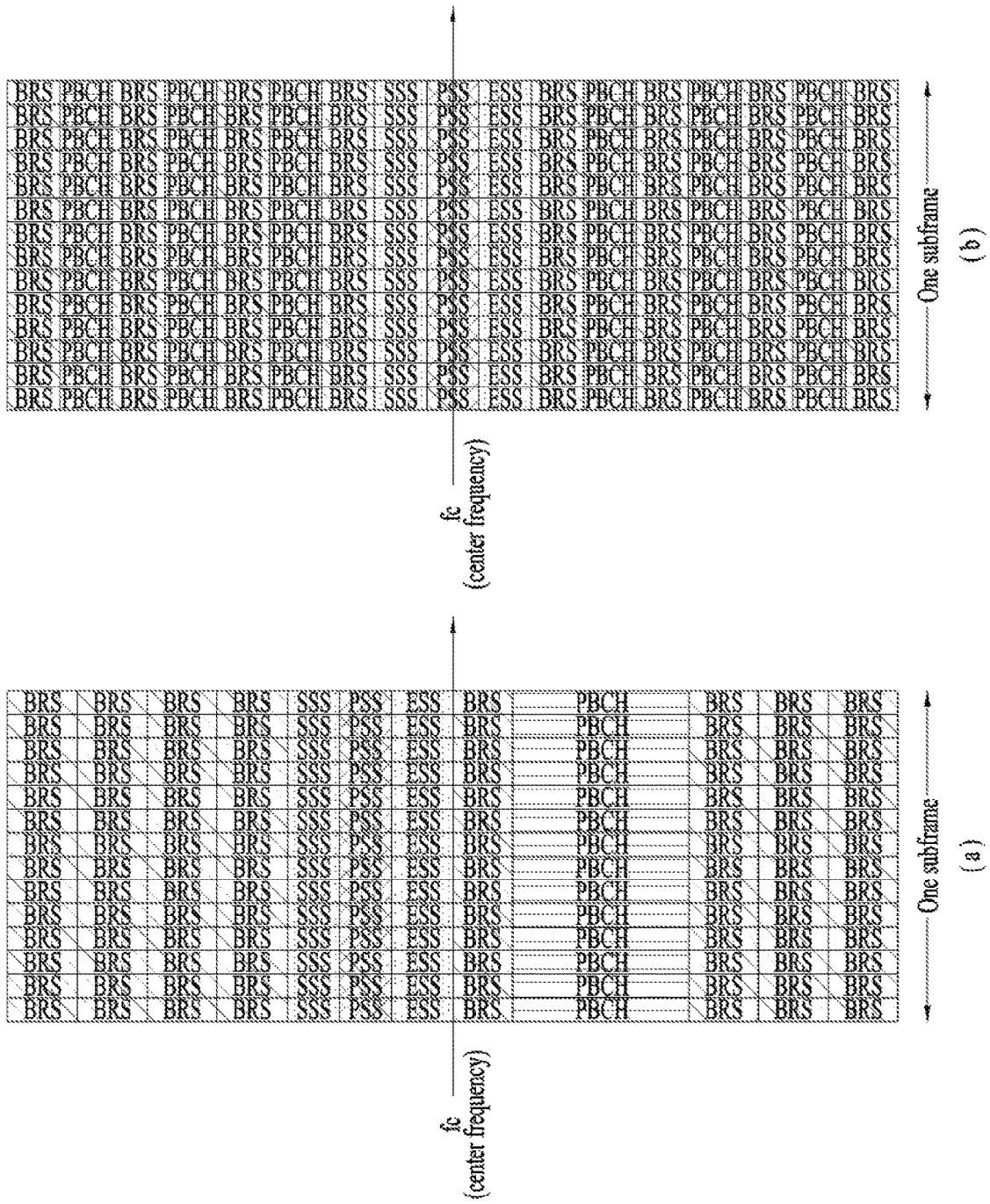

FIGS. 11 and 12 illustrate methods for mapping reference signals such as PSS/SSS/ESS/PBCH/BRS according to the present invention. Specifically, FIGS. 11 and 12 illustrate PSS/SSS/ESS/PBCH/BRS to RE mapping methods with respect to 100 MHz system bandwidth. When the subcarrier spacing is 75 kHz, 1 RB occupies 12 subcarriers and 1 subframe in the time domain. In addition, the 100 MHz bandwidth includes 100 RBs. When corresponding signals are transmitted, each symbol of a corresponding subframe may have a different beam (group) direction, and each beam (group) direction may have a different transmission information/sequence seed.

In PSS/SSS/ESS/PBCH/BRS to RE mapping method 1 illustrated in FIG. 11(a), PSS/SSS/ESS are mapped with respect to the center frequency, PBCHs are mapped to both sides of the PSS/SSS/ESS, and BRSs are mapped to frequencies outside the PBCHs.

In PSS/SSS/ESS/PBCH/BRS RE to RE mapping method 2 illustrated in FIG. 11(b), PSS/SSS/ESS are continuously mapped in the frequency domain, and PBCH blocks are mapped such that they are located to adjacent to each other unlike PSS/SSS/ESS/PBCH/BRS to RE mapping method 1 where PBCH blocks are distributed in the frequency domain. And, BRSs are mapped to the locations where the PSS/SSS/ESS/PBCH are not mapped.

PSS/SSS/ESS/PBCH/BRS to RE mapping method 3 illustrated in FIG. 12(a) is similar to PSS/SSS/ESS/PBCH/BRS to RE mapping method 2 illustrated in FIG. 11(b). However, in PSS/SSS/ESS/PBCH/BRS to RE mapping method 3, a BSR is mapped in the vicinity of the center frequency for BRS measurement unlike PSS/SSS/ESS/PBCH/BRS to RE mapping method 2 where no BRS is mapped to continuous bands where PSS/SSS/ESS/PBCH are transmitted.

In PSS/SSS/ESS/PBCH/BRS to RE mapping method 3 illustrated in FIG. 12(b), PSS/SSS/ESS are continuously mapped in the frequency domain. Specifically, according to PSS/SSS/ESS/PBCH/BRS to RE mapping method 3, PBCH blocks are mapped such that they are distributed in the frequency domain and Frequency Division Multiplexed (FDMed) with BRSs. By distributing the PBCH blocks in the frequency domain, it is possible to obtain frequency diversity gain. In this case, the PBCH decoding order, that is, in which order a UE should decode PBCHs needs to be signaled or promised. For example, the UE may sequentially decode the PBCHs, starting from the block closest to the center frequency or the block at one end of the frequency spectrum.

Although all of the PSS/SSS/ESS/PBCH/BRS are considered in FIGS. 11 and 12, if the PSS/SSS or PBCH can perform the role of the ESS, the ESS mapping may be omitted.

Figure 13:
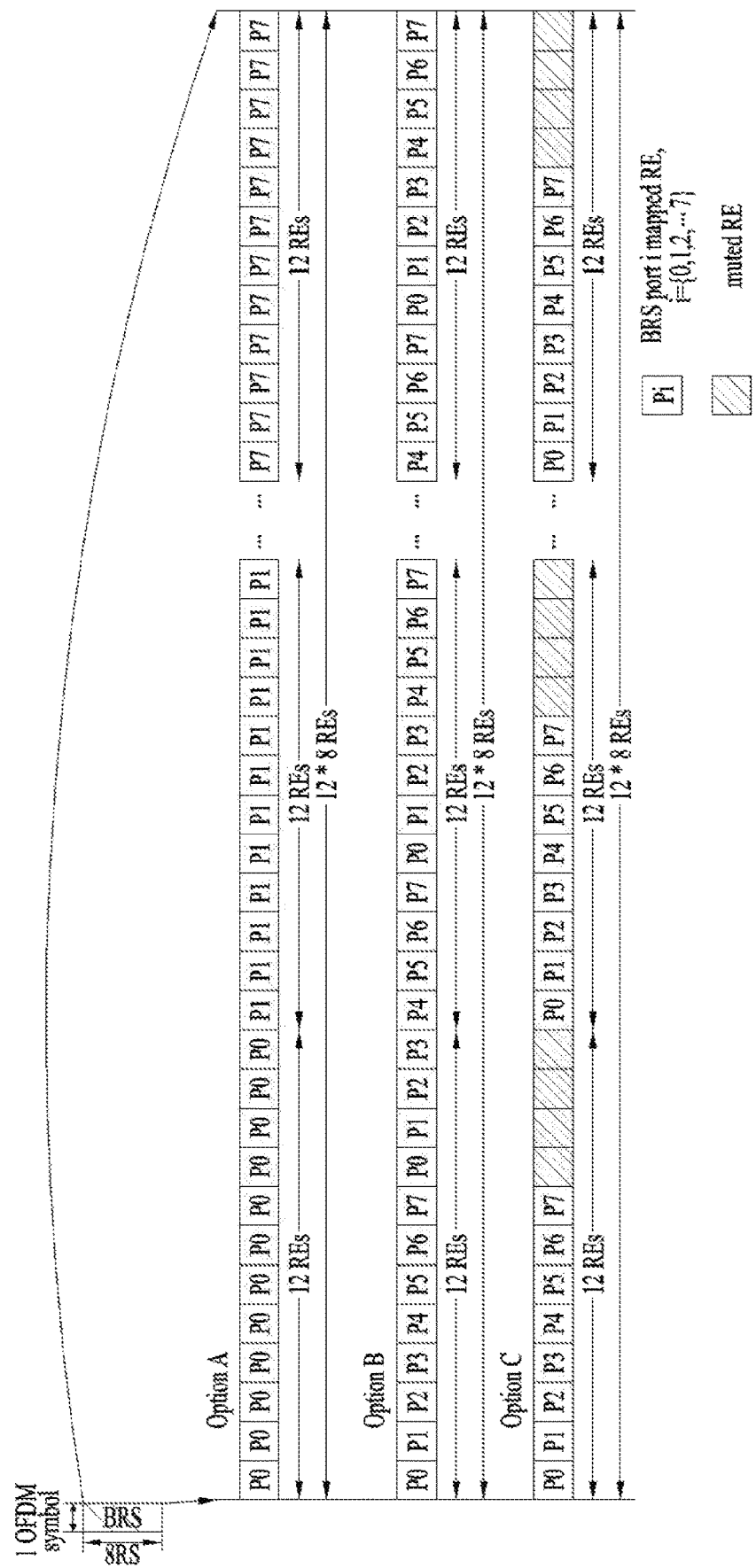
FIG. 13 illustrates a method for mapping a beam reference signal (BRS).

FIG. 13 illustrates a method for mapping a Beam Reference Signal (BRS).

Hereinafter, BRS mapping will be described in detail. The BRS is an RS for multiple antenna ports with a specific analog beam direction. In each of FIGS. 11(a), 11(b), 12(a), and 12(b), port mapping for one BRS block may be performed as shown in FIG. 13. One BRS block may include a plurality of REs, for example, 8*12 REs in the frequency domain and one OFDM symbol in the time domain. In FIG. 13, P0, P1, . . . , P7 respectively indicate BRSs for antenna ports 0, 1, . . . , 7. A UE measures and reports a received signal level per antenna port (for example, a ratio of noise and interference to RSRP, RSRQ, RSRP, etc.). Although FIG. 13 shows BRS port mapping for 8 antenna ports when the maximum number of BRS ports that can be transmitted in one cell is 8, the BRS port mapping can be applied in the similar manner when the maximum number of BRS ports is larger than 8.

Option A of FIG. 13 corresponds to a method of mapping a BRS for a single port to N consecutive REs, whereas option B of FIG. 13 corresponds to a method of mapping BRSs for multiple ports such that the BRSs are distributed in BRS transmission bandwidth at a uniform/similar interval. Meanwhile, in option C of FIG. 13, 8 BRS ports are mapped to one RB in the frequency domain, for example, 12 subcarriers, and the remaining REs are muted. Thus, it is possible to save eNB's transmission power. When PSS/SSS/ESS/PBCH are transmitted, the saved power can be used to boost the power of the PSS/SSS/ESS/PBCH. When a system is designed, RE mapping should be defined by assuming the maximum number of BRS ports. However, each eNB may have a different number of antenna ports where BRSs are actually transmitted within a range that does not exceed the maximum BRS port number. If a specific eNB has four BRS ports, BRSs for ports 0, 1, 2, and 3 can be mapped to the BRS port locations corresponding to ports 4, 5, 6, and 7. If there are two BRS ports, ports 0 and 1 can be uniformly mapped to the locations corresponding to ports 2, 3, 4, 5, 6 and 7.

Although FIG. 13 shows that the maximum of 12*8=96 REs are used by defining a basic unit for BRS port mapping as 12 REs, the invention is not limited thereto.

Figures 14, 15:
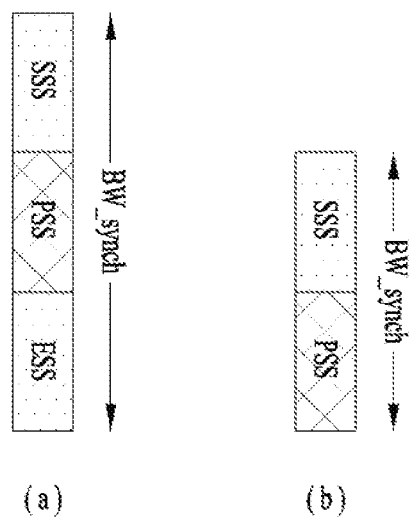
FIG. 14 illustrates examples of BRS port mapping according to the present invention.
FIG. 15 illustrates synchronization bandwidth according to the present invention.

FIG. 14 illustrates examples of BRS port mapping according to the present invention.

When M specific REs are used for BRS transmission, the transmission should be performed such that each BRS port occupies the same number of REs. Referring to FIGS. 14(a) and 14(b), when there are four BRS ports, an eNB may signal information on the number of BSR ports and map P0 BRS, P1 BRS, P2 BRS, and P3 BRS to P4 RE, P5 RE, P6 RE, and P7 RE, respectively. Alternatively, when option A of FIG. 13 is applied, the eNB may map P0 BRS to P1 RE, map P1 BRS to P2 RE and P3 RE, map P3 BRS to P4 RE and P5 RE, and map P4 BRS to P6 RE and P7 RE to maintain the continuity of the BRS port mapping. In addition, where there are two BRS ports, the eNB may uniformly map P0 BRS and P1 BRS to P2 RE, P3 RE, P4 RE, P5 RE, P6 RE and P7 RE. For example, referring to FIGS. 14(a) and 14(c), the eNB maps P0 BRS to P2 RE, P4 RE and P6 RE and maps P1 BRS to P3 RE, P5 RE and P7 RE. Alternatively, when option A of FIG. 13 is applied, the eNB may map P0 BRS to P1 RE, P2 RE and P3 RE and map P1 BRS to P4 RE, P5 RE, P6 RE and P7 RE by considering the continuity of the BRS port mapping.

When option C of FIG. 13 is applied, other information including a PBCH may be mapped to muted REs regardless of the number of BRS ports.

<Consideration for Narrowband UEs>

In FIGS. 11 and 12, the PSS/SSS/ESS/PBCH/BRS mapping methods are proposed without any special consideration for the minimum bandwidth of UEs. However, if there are UEs with small bandwidth unlike the assumption of FIGS. 11 and 12 that UEs can support 100 MHz bandwidth, to allow the UEs with small bandwidth, for example, narrowband UEs incapable of supporting 100 MHz to access a system, theses narrow UEs should be considered in determining the resource mapping and design of PSS/SSS/ESS/PBCH/BRS. In one system, the minimum system bandwidth (BW_sys_min) supported by the system can be defined, and separately, the minimum UE bandwidth (BW_ue_min) can also be defined. If BW_sys_min=BW_ue_min, there is no problem. However, if BW_sys_min>BW_ue_min, the system should be designed such that when a UE capable of supporting only the minimum bandwidth attempts to access the system, the UE can be served by an eNB. That is, to receive services from the eNB, the UE should be able to perform initial access to the network. In addition, to perform the initial access to the network, a basic frequency unit for transmitting PSS/SSS/ESS/PBCH should be equal to or less than BW_ue_min Considering that there is a narrow UE that can support only a smaller bandwidth than the system bandwidth, it is desirable that signals/channels/information essential for the initial access are transmitted in a localized manner. For example, PSS/SSS/ESS/PBCH should be consecutively transmitted in the frequency domain. Alternatively, considering that a UE preferentially detects PSS/SSS (/ESS) of a cell for synchronization with the cell, the eNB may first allocate the PSS/SSS(/ESS) of the cell consecutively in the frequency domain, transmit the PSS/SSS(/ESS), and then allow the UE to decode a PBCH. The PSS/SSS/ESS/PBCH/BRS mapping method in consideration of narrowband UEs may be changed depending on the UE's minimum capability. Hereinafter, UE's minimum bandwidth capability, PSS/SSS/ESS transmission bandwidth, PBCH transmission bandwidth, and PSS/SSS/ESS/PBCH transmission bandwidth are denoted by BW_ue_min, BW_synch, BW_pbch, and BW_ss(=BW_synch+BW_pbch), respectively.

In the case of BW_synch≤BW_ue_min≤BW_ss and BW_pbch≤BW_ue_min, PSS/ESS/ESS should be preferentially detected for time-frequency synchronization, and thus a UE first detects the PSS/SSS/ESS. FIG. 15 illustrates synchronization bandwidth according to the present invention. As shown in FIG. 15(a), BW_synch may mean the bandwidth obtained by combining the PSS transmission bandwidth, the SSS transmission bandwidth, and the ESS transmission bandwidth all together. If no ESS is transmitted, BW_synch may mean the bandwidth obtained by combining the PSS transmission bandwidth and the ESS transmission bandwidth as shown in FIG. 15(b). A UE primarily performs time-frequency synchronization by detecting PSS/SSS/ESS or PSS/SSS. Subsequently, the UE performs PBCH decoding using symbol/subframe/frame timing, frequency synchronization, and a cell ID obtained from the PSS/SSS/ESS or PSS/SSS. For the PBCH decoding, the UE switches frequency in a subframe corresponding to the next SS transmission period. Then, the UE receives/decodes the PBCH. In this case, it is desirable that the PBCH is also localized in the frequency domain to be transmitted. Thereafter, if the UE succeeds in decoding of the PBCH, the UE performs BRS measurement. At this time, even if a BRS is transmitted over the whole bandwidth, the basic unit block for the BRS measurement should be localized to be transmitted. In addition, the BRS unit block should be equal to or less than BW_ue_min. All ports where BRS transmission is performed may be mapped to a corresponding BRS unit block. Alternatively, only a BRS corresponding to a specific port may be mapped to a corresponding BRS unit block and then transmitted. The UE can perform the BRS measurement by changing frequency on a BRS unit block basis.

In the case of BW_ss≤BW_ue_min, a UE detects/decodes PSS/SSS/ESS/PBCH first and performs BRS measurement by changing frequency in a subframe corresponding to the next SS transmission period. In this case, since UE_ue_min is larger than BW_ss, the BRS band that the UE can measure at one time becomes larger than that in the foregoing example. Thus, the PSS/SSS/ESS/PBCH needs to be localized in the frequency domain to be transmitted.

As another method of considering narrowband UEs, the UEs can be allowed to enter different systems depending on their bandwidth capabilities. In this case, separate synchronization signal mapping can be considered for the narrowband UEs.

Figure 16:
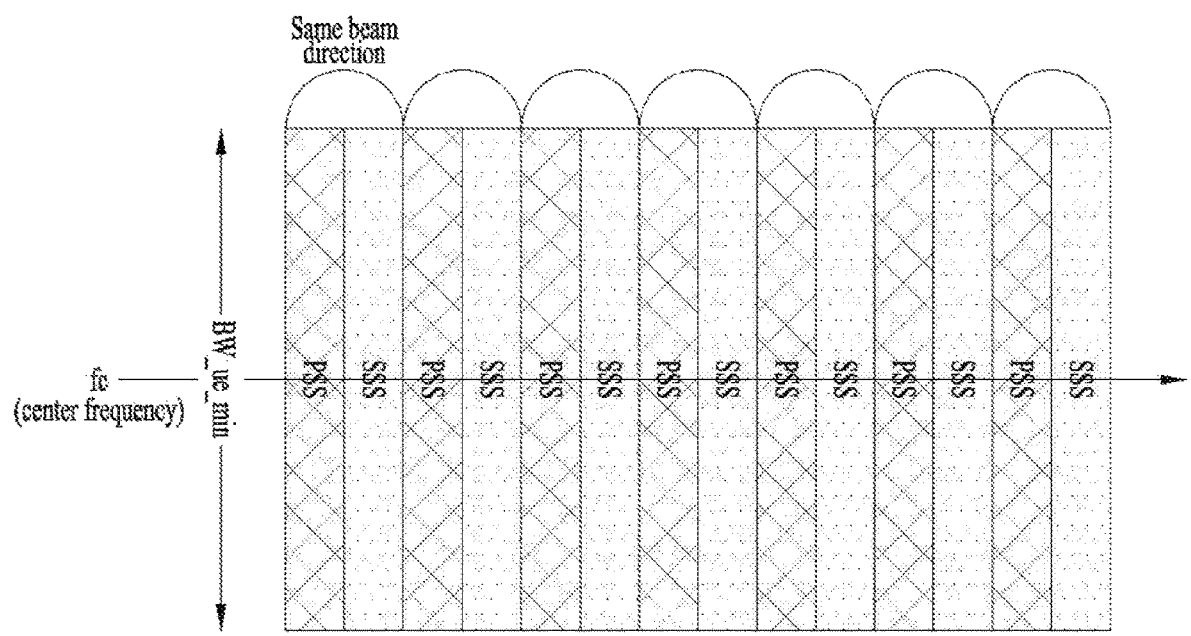
FIG. 16 illustrates synchronization signal mapping for a narrowband UE.

FIG. 16 illustrates synchronization signal mapping for a narrowband UE. Referring to FIG. 16, the bandwidth for PSS/SSS transmission should be equal to or less than BW_ue_min A PSS and an SSS (including an ESS) are transmitted in different symbols. In this case, a PSS pairs up with a consecutive SSS (including an ESS), and the PSS and SSS (including the ESS) corresponding to one pair, which are located in consecutive symbols, are transmitted in the same beam direction. In this case, the PSS/SSS beam direction may be changed every two or three symbols.

If an eNB performs transmission by changing the beam direction of the synchronization signal pair depending on time, a PBCH may be repeatedly transmitted in a band close to the band where PSS/SSS/ESS are transmitted whenever the beam direction is changed. For example, PSSs/SSSs/ESSs are FDMed with PBCHs, but a PBCH with a certain beam direction may be mapped to each of the symbols where the PSS/SSS/ESS with the same beam direction are present. Alternatively, a PBCH may be mapped per symbols where PSS/SSS/ESS are present (for example, two or three symbols) and then transmitted. For example, PSSs/SSSs/ESSs are FDMed with PBCHs, and a PBCH with a certain beam direction may be mapped to some of the symbols where the PSS/SSS/ESS with the same beam direction are present. As a further method, a PBCH may be transmitted in some of the symbols where PSS/SSS/ESS are transmitted, and a BRS may be transmitted in the remaining symbols to which the PBCH is not mapped.

<Utilization of Subframes in which No Synchronization Signals are Transmitted>

According to the beam scanning assumed in the present invention, an eNB with multiple antennas performs transmission by performing beamforming in a specific direction every transmission time. The purpose of the beam scanning is to achieve omni-directional transmission by performing signal transmission in a different beam direction every transmission time. In particular, it is possible to increase the coverage of signals necessary for initial access by performing beamforming to overcome the propagation loss and blockage of a channel where the mmWave technology is applied. According to the present invention, the signals necessary for initial access (hereinafter such a signal is referred to as an initial access signals) are periodically transmitted with a specific periodicity. In addition, signals such as PSS/SSS/ESS/PBCH may be transmitted in each symbol of a specific subframe where the initial access signals are transmitted. In the specific subframe, a PSS, an SSS, an ESS, and a PBCH may exist in each symbol, or at least one of the SS, SSS, ESS, and PBCH may exist in each symbol. However, when UEs are concentrated in a specific area of a certain cell or when the number of UEs served by the cell is not large, an eNB may not need to transmit signals for initial access omni-directionally. Alternatively, in a band where analog beamforming is not required, that is, in a band where an eNB does not have to perform omni-directional SS transmission (for example, an LTE band equal to or less than 6 GHz), the eNB may not need to transmit SSs in multiple directions. For the case where an eNB does not need to transmit SSs for a cell in all directions, the present invention proposes to transmit initial access signals such as PSS/SSS/ESS/PBCH in one subframe as follows. Hereinafter, signals essential for frequency-time synchronization with a cell in initial access such as PSS/SSS/ESS/PBC/BRS and the like are commonly called a Synchronization Signal (SS).

Alt 1. Simple Repeated Transmission

According to Alt 1, if SSs do not need to be transmitted for a cell in multiple beam directions, an SS can be transmitted repeatedly. Assuming that one subframe is composed of N symbols and the number of analog beam (group) directions that should be transmitted in one subframe is M, each direction may occupy N/M symbols. An eNB repeatedly transmits an SS in the same direction during the N/M symbols. In the case of M=1, the eNB transmits an SS in the same analog beam direction in each of the N symbols.

Alt 2. Transmission of as Many SSs as the Number of Necessary Symbols.

According to Alt 2, SSs are transmitted in certain directions where SS transmission is necessary. For example, it is assumed that SS transmission needs to be performed in M directions (where M<N) among a total of N analog beam (group) directions and the number of symbols necessary for transmitting SSs in all N beam directions is N. According to Alt 2, SSs are transmitted only in M symbols, and no SS is transmitted in the remaining N−M symbols. In this case, any signals may not be transmitted in the remaining N−M symbols. Alternatively, SSs are transmitted only in the M symbols, and DL data/control channels may be transmitted in the remaining N−M symbols. To allow DL data/control channel transmission in the symbols which are not used for the SS transmission among the N symbols available for the SS transmission, a DL data/control channel should be scheduled on a symbol basis. When a DL data/control channel can be scheduled on a symbol basis, an eNB may schedule the DL data/control channel by specifying a specific symbol.

Alt 3. Transmission of SSs in a Subframe Available for SS Transmission after Time Division Multiplexing (TDM) with DL/UL Data or DL/UL Control Information According to Alt 3, if an eNB recognizes that UEs are concentrated in a specific area, the eNB may transmit an SS by targeting a specific directions(s). The eNB may recognize that the UEs are concentrated in the specific area from users before providing services (or before the eNB is turned on) or from measurement reports based on BRSs or specific RSs, which are made by the UEs. If the eNB repeatedly transmits an SS in the same direction as described in Alt 1 despite recognizing that the UEs are concentrated in the specific area, it may become very inefficient unless it is separately signaled that the UEs should combine corresponding signals. In addition, similar to Alt 2, data and/or control information may be transmitted in symbols where no SS is transmitted. However, in this case, it is more desirable to transmit the data and/or control information by gathering a plurality of symbols consecutively or contiguously than to transmit the data and/or control information by segmenting resources. This is because if a data/control signal is segmented and transmitted in the time domain due to existence of an SS, it may cause segmentation overhead such as control overhead, CRC, etc. When the eNB transmits an SS in the direction where a UE exists or it is expected that a UE will exist, the eNB may gather symbols reserved for the corresponding direction in the time domain. In addition, the eNB may separately gather symbols where no SS is transmitted in order to transmit DL/UL data/control signal transmission on consecutive symbols. To this end, the eNB may change the locations of the symbols reserved for the SS transmission during or before operating the system. In other words, the locations of symbols used for SS transmission for a specific cell in a specific beam direction may be changed within a subframe. If UEs are concentrated at a specific location, the eNB may transmit an SS in a symbol(s) of a subframe for SS transmission (hereinafter such a subframe is referred to as an SS subframe). In this case, it is desirable that the eNB determines the locations of symbols for the SS transmission (hereinafter such a symbol is referred to as an SS symbol), starting from the last symbol of the corresponding SS subframe or the symbol with a specific index. An SS can be multiplexed with a DL/UL data/control signal in a TDM manner. For example, the SS may be multiplexed with the DL/UL data/control signal as shown in FIG. 17.

Figure 17:
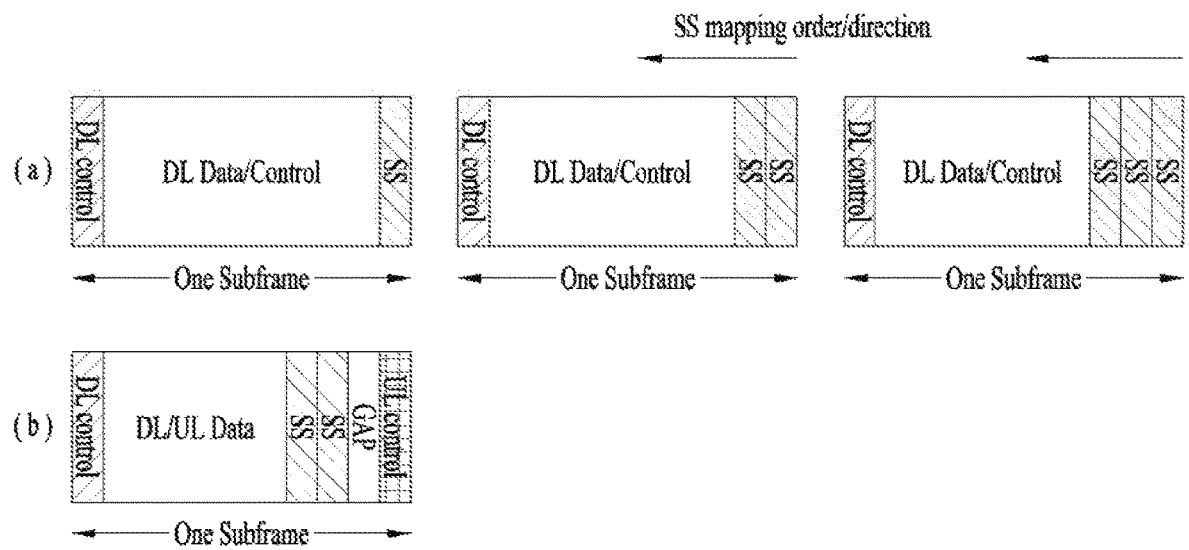
FIG. 17 illustrates a synchronization signal transmission method according to the present invention.

FIG. 17 illustrates a synchronization signal transmission method according to the present invention. In particular, FIG. 17 shows subframe structures when an SS is transmitted in some specific symbols of a subframe.

When data and control information is transmitted in specific symbols of a subframe where it is expected that SS transmission will be performed with SS transmission periodicity (hereinafter such a subframe is referred to as an SS subframe), it is preferred to transmit a DL control channel at least in the first symbol of the corresponding SS subframe in order to inform a UE of this fact. In particular, when DL data is transmitted in the corresponding SS subframe, this fact should be informed. Here, the SS subframe means a subframe in which an SS can be transmitted. Even if an SS is transmitted only in some symbols of an SS subframe and data and control channels are transmitted in the remaining symbols, it is desirable to fix the SS subframe to a DL subframe and limit the data and control channels to downlink data and control channels. FIG. 17(a) illustrates methods by which an eNB maps SSs starting from the last symbol of a subframe when transmitting the SS only in some symbols of the subframe. However, even if the corresponding subframe is fixed to a DL subframe, it is possible to reserve symbols for transmitting a UL control channel. In the case of an SS subframe capable of transmitting a UL control channel, the last symbol or a predetermined number of symbols can be reserved for the UL control channel, and SS mapping may be performed from the last symbol except the reserved symbol(s). In this case, as shown in FIG. 17(b), there may exist a gap between an SS transmission symbol and a symbol reserved for the UL control channel.

Figure 18:
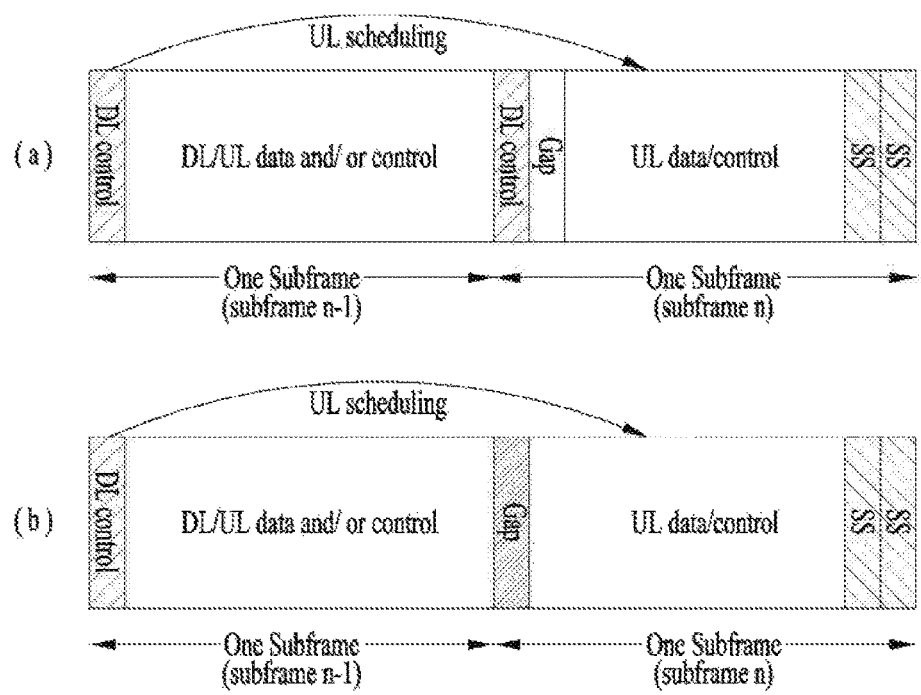
FIG. 18 illustrates a method for transmitting an uplink signal in a subframe available for synchronization signal transmission.

FIG. 18 illustrates a method for transmitting an uplink signal in a subframe available for synchronization signal transmission. Specifically, FIG. 18(*a*) shows a case in which the subframe where the synchronization signal is present includes a DL control symbol, and FIG. 18(*b*) shows a case in which the subframe where the synchronization is present includes no DL control symbol.

It may be difficult for a certain UE to perform UL grant reception and UL transmission in accordance with the corresponding UL grant on the same subframe due to processing delay that occurs until preparation for data transmission after reception and decoding of scheduling grant. Thus, if an eNB knows that SSs are transmitted in some symbols of a subframe and is able to schedules DL data, it may mean that UL data can be scheduled at least in a previous subframe. FIG. 18 shows the structures of an SS subframe when UL data and control channels are scheduled in the SS subframe.

If an SS subframe has a DL control symbol, subframe n, which is the SS subframe, has the structure of 'DL control symbol(s)+gap symbols (for switching from DL to UL)+UL data/control symbol(s)+SS symbol(s)' as shown in FIG. 18(*a*).

If an SS subframe has no DL control symbol, UL scheduling information for subframe n, which is the SS subframe, is transmitted/received in the previous subframe (subframe n−1 or subframe n−k). If the last symbol of subframe n−1, which corresponds to the previous subframe of subframe n, is a DL transmission symbol, subframe n has the structure of 'gap symbol(s)+UL data/control signal symbol(s)+SS symbol(s)' as shown in FIG. 18 (*b*). If the last symbol of the previous subframe of the SS subframe is a UL transmission symbol, the SS subframe has the structure where DL data/control signal transmission starts with no gap interval. If a DL control symbol of a specific subframe is able to schedule UL data of the specific subframe, DL or UL data transmission may be performed in a data region of the specific subframe by scheduling information in the DL control symbol of the specific subframe.

If an eNB receives, from a UE(s), a measurement report based on a BRS or a specific RS only with respect to a specific direction and does not receive any measurement reports with respect to other directions, the eNB may recognize that the UEs are concentrated in a specific area and thus transmit an SS in the specific direction. In addition, when the eNB performs SS transmission omni-directionally or in multiple directions, the eNB may recognize the fact that UEs are concentrated toward a specific direction(s) and obtain information on the specific direction(s) after elapse of a predetermined time from transmitting SSs in all symbols of an SS subframe. In this case, for efficient use of resources, the eNB may attempt the SS transmission only in the specific direction(s) where the UEs are concentrated and transmit DL/UL data and control information except an SS in the remaining symbol period. The symbol for transmitting the SS in the specific direction where the UEs are concentrated may be located at the start of the corresponding subframe or an arbitrary position. In this case, the eNB may simply transmit the SS in the corresponding symbol and transmit the DL/UL data and control information in the remaining symbols. However, for efficient resource use and scheduling, it is preferable to move the SS for the valid direction at a specific position (for example, at the start or end) of the subframe.

Figure 19:
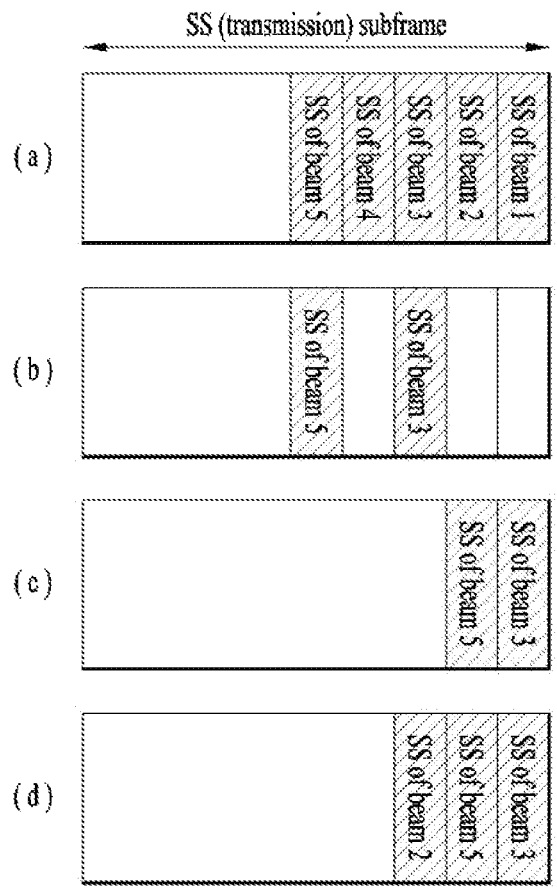
FIG. 19 illustrates a method for transmitting initial access signals for a cell according to the present invention.

FIG. 19 illustrates a method for transmitting initial access signals for a cell according to the present invention.

For example, it is assumed that a cell has a total of five beam directions, all SSs of the five beam directions are transmitted in one SS subframe, and X symbols are required for transmitting an SS in one beam direction. Here, X indicates the number of symbols occupied by a set of signals necessary for initial access. For example, when a PSS and an SSS are required for initial access to a cell and when each of the PSS and SSS occupies one symbol, that is, the PSS and SSS are transmitted in two symbols, X may be set to two. An eNB may transmit SSs for the cell in 5*X symbols in the five beam directions, starting at the last symbol of the SS subframe as illustrated in FIG. 19(*a*). When the eNB determines that UEs are concentrated in beam direction 5 (i.e., beam 5) and beam direction 3 (i.e., beam 3), the eNB may turn off the SS transmission in the remaining beam directions as illustrated in FIG. 19(*b*). To efficiently transmit/receiving data/control signals in the SS subframe, the eNB may change the locations where the SS of beam direction 5 and the SS of beam direction 3 are transmitted in the end of the subframe.

If the eNB transmits an SS only in a specific beam (group) direction, UEs located outside of the corresponding direction may not access the corresponding cell. Therefore, the eNB may intermittently perform SS transmission in different directions in symbols except the symbol(s) used for transmitting the SS in the direction where UEs are concentrated (for example, with a periodicity corresponding to an integer multiple of the SS transmission periodicity, where the integer is greater than 1). The eNB may increase the number of SS transmission symbols depending on reception of PRACHs from the UEs. For example, if UEs are concentrated in beam directions 3 and 5, the eNB may transmit the SS of beam direction 3 and the SS of beam direction 5 frequently and transmit SSs of other directions intermittently. In this case, if a PRACH corresponding to the SS of beam direction 2 is received, the eNB may transmit the SS of beam direction 2 as well as the SS of beam direction 3 and the SS of beam direction 5 in the SS subframe as shown in FIG. 19(*d*). To increase the number of SS transmission symbols, the eNB may use a symbol next to the current SS transmission symbol as an SS transmission symbol.

Although FIG. 19 shows that last symbols the subframe are used for the SS transmission, first, middle, or specific symbols can also be used for the SS transmission.

According to the present invention, the location where an SS is transmitted (in a specific beam direction) can be changed within an SS subframe while the system for a corresponding cell operates. In this case, considering that a UE can perform synchronization with respect to an SS transmitted in a specific symbol, i.e., an SS transmitted in one beam direction, if the symbol location of the SS transmitted toward to the UE is changed, there is a risk that the UE may determine that the corresponding serving cell disappears. If the symbol location of the SS transmitted in the UE's beam direction is changed, the BRS, which is periodically measured by the UE, disappears and the UE cannot measure any signals so that the UE may determine that the corresponding channel is deep fading. Thus, the UE may measure and report RSRP, which indicates low reception performance. Further, since the UE continuously fails to detect an SS for the corresponding beam, the UE may declare Radio Link Failure (RLF). Thus, to prevent RLF from occurring at UEs due to sudden change of SS symbols, the eNB should inform the UEs of the change of the SS transmission location in advance. For example, the eNB may inform a UE of the symbol or location where an SS will move and be transmitted and then instruct the UE to perform measurement on the corresponding symbol. Alternatively, the eNB may inform a UE that the location of an SS transmission symbol will be changed and then instruct the UE to newly search for an SS. For example, the eNB may transmit the following information as SS transmission symbol/location change indication signaling information to a UE(s).

Transmission Symbol Location Change Application Time

Time information indicating when the location of the previously transmitted SS will be changed: This time information corresponds to information indicating when the changed SS symbol location will be applied. For example, the time information may informs a UE(s) of a specific subframe where the UE(s) should use the changed SS symbol location or after how many SS transmission periods the UE(s) should use the changed SS symbol location upon reception of the time information.

Signaling of Transmission Symbol Location Change

Option 1: Exact Location Information Signaling

If some or all of the SS transmission symbols associated with a plurality of SSs transmitted in an SS transmission subframe are changed, an eNB can signal the location changes to a UE. For example, the eNB may inform that in a subframe corresponding to "transmission symbol location change application time", the SS, which has been transmitted in a specific symbol index, will be transmitted in another symbol index. In other words, the index of the symbol in which the SS is transmitted will be changed after a specific time. In this case, the symbol indices before and after the change can be explicitly signaled. In addition, upon receiving the symbol indices before/after the change, a UE may combine the SS transmitted in the previous symbol and the SS to be transmitted in the changed symbol. In particular, in the case of a DL-RS for DL RRM measurement (e.g., BRS, CRS, CSI-RS, etc.), the UE may assume that measurement for the DL-RS transmitted in the previous symbol and measurement for the DL-RS transmitted in the changed symbol is measurement for the same analog beam and then accumulate the DL-RS measurement before the change of the symbol location and the DL-RS measurement after the change of the symbol location for the same DL-RS.

Alternatively, the eNB may separately signal whether a UE performs accumulation for SSs transmitted in the same direction but different symbol indices. When it is signaled that SSs transmitted in the same directions but different symbol indices are accumulated, the UE may consider that an SS received in a specific symbol before location change is equal to an SS received in a symbol that corresponds to the changed location of the specific symbol. On the contrary, when it is not signaled that SSs transmitted in the same directions but different symbol indices are accumulated, the UE assume the corresponding SS as a new SS.

Option 2: UE Blind Detection

In option 2, information indicating that the location of an SS transmission symbol will be changed is signaled but particular information on after how many symbols the SS corresponding to a specific symbol will be transmitted is not transmitted unlike option 1. If a UE knows that an SS which the UE knows will be transmitted in a different symbol, the UE performs blind detection of the SS on SS subframes. In this case, the eNB may signal whether the UE performs calculation/processing by accumulating existing DL-RSs and PSSs/SSSs/ESSs. If the accumulation of DL-RSs/PSSs/SSSs/ESSs is signaled, the UE may consider that an SS received in a specific symbol before location change is equal to an SS received in a symbol that corresponds to the changed location of the specific symbol. On the contrary, when it is not signaled that SSs transmitted in the same directions but different symbol indices are accumulated, the UE assume the corresponding SS as a new SS.

Alternatively, in a band where analog beamforming is not required, that is, in a band where SS transmission can be performed omni-directionally, SSs may not need to be transmitted in multiple directions. In this case, the location of the SS transmission symbol is fixed in the system, and SSs may be TDMed with other DL/UL data/control signals in the same subframe as shown in FIGS. 17 and 18. At this time, an ESS and a BRS may not be needed. Thus, PSS/SSS are FDMed with each other and then transmitted in specific symbols. A PBCH can also be FDMed or TDMed with the PSS/SSS.

Figure 20:
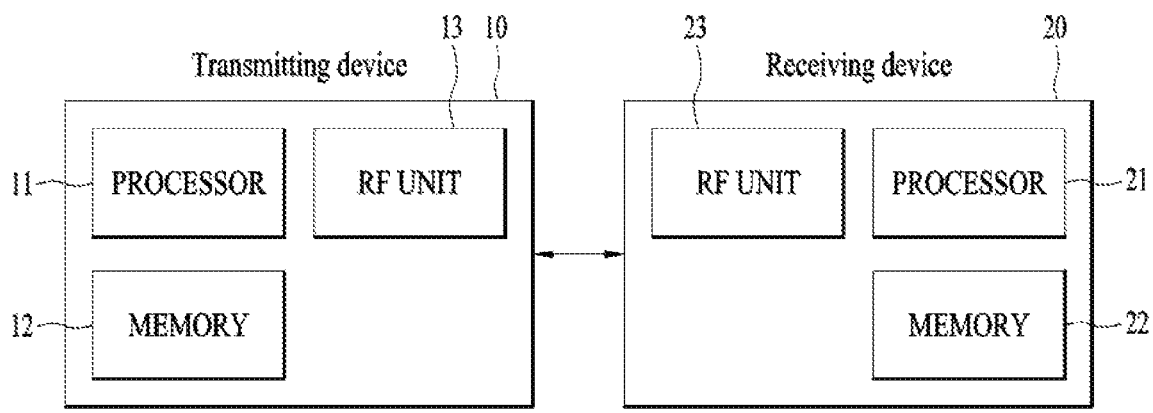
FIG. 20 is a block diagram illustrating elements of a transmitting device 10 and a receiving device 20 for implementing the present invention.

FIG. 20 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

According to the present invention, the eNB processor may control the eNB RF unit to transmit initial access signals necessary for the UE to perform initial access to a cell (hereinafter referred to as an SS) in accordance with any one of the proposals of the present invention. In addition, the eNB processor may allocate and transmit DL data/control signals to and in a subframe for transmitting an SS (hereinafter referred to as an SS subframe) in accordance with any one of the proposals of the present invention. Moreover, the eNB processor may schedule a UL data signal in an SS subframe and receive a UL control signal in the SS subframe.

According to the present invention, the UE processor may control the UE RF unit to receive an SS in a cell in accordance with any one of the proposals of the present invention. In addition, the UE processor may achieve time-frequency synchronization with the cell based on the SS and access the cell based on the SS. Moreover, the UE processor may monitor a DL control signal that schedules DL or UL data in a subframe. Furthermore, the UE processor may control the UE RF unit to receive DL data in an SS subframe based on the DL control signal or transmit UL data in the SS subframe based on the DL control signal. Further, the UE processor may control the UE RF unit to transmit a UL control signal in an SS subframe. Additionally, the UE processor may monitor an SS in an SS subframe for the cell that the UE currently accesses.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method of transmitting a synchronization signal by a base station (BS), the method comprising:
    transmitting N synchronization signal sets in a first subframe, where N is an integer larger than 1,
    wherein each of the N synchronization signal sets is related to one of N different transmission beam directions; and
    turning off M synchronization signal sets among the N synchronization signal sets and transmitting the remaining N−M synchronization signal sets in a second subframe, where M is an integer smaller than N,
    wherein each of the N−M synchronization signal sets is related to one of N−M transmission beam directions,
    wherein each of the first and second subframes includes a plurality of time symbol sets, each of which includes one or more time symbols in a time domain,
    wherein the N synchronization signal sets are respectively transmitted in N time symbol sets among the plurality of time symbol sets in the first subframe,
    wherein the N−M synchronization signal sets are respectively transmitted in N−M time symbol sets among the plurality of time symbol sets in the second subframe, and
    wherein each of synchronization signal sets includes at least one of a primary synchronization signal (PSS) or a secondary synchronization signal (SSS).

2. The method according to claim 1, wherein the N time symbol sets are consecutive, and wherein the N−M time symbol sets are consecutive.

3. The method according to claim 2, wherein the N−M time symbol sets are composed of symbols at the start of the second subframe or symbols at the end of the second subframe.

4. The method according to claim 1, comprising:
    transmitting either the N synchronization signal sets or the N−M synchronization signal sets in each of a plurality of subframes for synchronization signal transmission,
    wherein the plurality of subframes for synchronization signal transmission occur on a first periodicity,
    wherein the first and second subframes are included in the subframes for the synchronization signal transmission.

5. The method according to claim 4, comprising:
transmitting the M synchronization signal sets with a second periodicity longer than the first periodicity after the first subframe; and
based on a random access preamble being received on a random access channel resource associated with a first synchronization signal set among the M synchronization signal sets, turning on the first synchronization signal set and transmitting the N−M synchronization signal sets and the first synchronization signal set in N−M+1 time symbol sets with the first periodicity,
wherein the N−M+1 time symbol sets are consecutive.

6. The method according to claim 1, further comprising:
transmitting information indicating the second subframe where the M synchronization signal sets are off.

7. The method according to claim 1, further comprising:
transmitting information indicating that some of the N synchronization signal sets are off.

8. A base station (BS) for transmitting a synchronization signal, the BS comprising:
a radio frequency (RF) unit including a transceiver; and
a processor configured to control the RF unit, the processor configured to:
control the RF unit to transmit N synchronization signal sets in a first subframe, where N is an integer greater than 1,
wherein each of the N synchronization signal sets is related to one of N different transmission beam directions; and
control the RF unit to turn off M synchronization signal sets among the N synchronization signal sets and transmit the remaining N M synchronization signal sets in a second subframe, where M is an integer smaller than N,
wherein each of the N−M synchronization signal sets is related to one of N−M transmission beam directions,
wherein each of the first and second subframes includes a plurality of time symbol sets, each of which includes one or more time symbols in a time domain,
wherein the N synchronization signal sets are respectively transmitted in N time symbol sets among the plurality of time symbol sets in the first subframe,
wherein the N−M synchronization signal sets are respectively transmitted in N−M time symbol sets among the plurality of time symbol sets in the second subframe, and
wherein each of synchronization signal sets includes at least one of a primary synchronization signal (PSS) or a secondary synchronization signal (SSS).

9. The BS according to claim 8, wherein the N time symbol sets are consecutive, and wherein the N−M time symbol sets are consecutive.

10. The BS according to claim 9, wherein the N−M time symbol sets are composed of symbols at the start of the second subframe or symbols at the end of the second subframe.

11. The BS according to claim 8,
wherein the processor is configured to control the RF unit to transmit either the N synchronization signal sets or the N−M synchronization signal sets in each of a plurality of subframes for synchronization signal transmission,
wherein the plurality of subframes for synchronization signal transmission occur on a first periodicity, and
wherein the first and second subframes are included in the subframes for the synchronization signal transmission.

12. The BS according to claim 11, wherein the processor is configured to:
control the RF unit to transmit the M synchronization signal sets with a second periodicity longer than the first periodicity after the first subframe; and
based on a random access preamble being received on a random access channel resource associated with a first synchronization signal set among the M synchronization signal sets, control the RF unit to turn on the first synchronization signal and transmit the N−M synchronization signal sets and the first synchronization signal set in N−M+1 time symbol sets with the first periodicity, and
wherein the N−M+1 time symbol sets are consecutive.

13. The BS according to claim 8, wherein the processor is configured to control the RF unit to transmit information indicating the second subframe where the M synchronization signal sets are off.

14. The BS according to claim 8, wherein the processor is configured to control the RF unit to transmit information indicating that some of the N synchronization signal sets are off.

15. A method for receiving a synchronization signal by a user equipment (UE), the method comprising:
receiving at least one of N synchronization signal sets in a first subframe, where N is an integer larger than 1,
wherein each of the N synchronization signal sets is related to one of N different transmission beam directions; and
receiving at least one of N−M synchronization signal sets in a second subframe, where M is an integer smaller than N, and wherein M synchronization signal sets are turned off among the N synchronization signal sets,
wherein each of the N−M synchronization signal sets is related to one of N−M transmission beam directions,
wherein each of the first and second subframes includes a plurality of time symbol sets, each of which includes one or more time symbols in a time domain,
wherein the N synchronization signal sets are respectively transmitted in N time symbol sets among the plurality of time symbol sets in the first subframe,
wherein the N−M synchronization signal sets are respectively transmitted in N−M time symbol sets among the plurality of time symbol sets in the second subframe, and
wherein each of synchronization signal sets includes at least one of a primary synchronization signal (PSS) or a secondary synchronization signal (SSS).

16. A user equipment (UE) for receiving a synchronization signal, the UE comprising:
a radio frequency (RF) unit including a transceiver; and
a processor configured to control the RF unit, the processor configured to:
control the RF unit to receive at least one of N synchronization signal sets in a first subframe, where N is an integer larger than 1,
wherein each of the N synchronization signal sets is related to one of N different transmission beam directions; and
control the RF unit to receive at least one of N−M synchronization signal sets in a second subframe, where M is an integer smaller than N, and wherein M synchronization signal sets are turned off among the N synchronization signal sets,
wherein each of the N−M synchronization signal sets is related to one of N−M transmission beam directions, wherein each of the first and second subframes includes a plurality of time symbol sets, each of which includes one or more time symbols in a time domain, wherein the N synchronization signal sets are respectively transmitted in N time symbol sets among the plurality of time symbol sets in the first subframe, wherein the N–M synchronization signal sets are respectively transmitted in N–M time symbol sets among the plurality of time symbol sets in the second subframe, and wherein each of synchronization signal sets includes at least one of a primary synchronization signal (PSS) or a secondary synchronization signal (SSS).

* * * * *